(12) United States Patent
Furuhata

(10) Patent No.: US 7,965,609 B2
(45) Date of Patent: Jun. 21, 2011

(54) OPTICAL PICKUP DEVICE AND OPTICAL RECORDING MEDIUM INFORMATION REPRODUCTION DEVICE

(75) Inventor: Hitoshi Furuhata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 302 days.

(21) Appl. No.: 12/159,117

(22) PCT Filed: Dec. 13, 2006

(86) PCT No.: PCT/JP2006/324827
§ 371 (c)(1),
(2), (4) Date: Feb. 18, 2009

(87) PCT Pub. No.: WO2007/074644
PCT Pub. Date: Jul. 5, 2007

(65) Prior Publication Data
US 2009/0285077 A1    Nov. 19, 2009

(30) Foreign Application Priority Data

Dec. 27, 2005 (JP) .............................. P2005-376222

(51) Int. Cl.
*G11B 7/135* (2006.01)
*G11B 7/00* (2006.01)
(52) U.S. Cl. ......... 369/112.03; 369/112.05; 369/112.07; 369/44.37

(58) Field of Classification Search ............. 369/112.01, 369/112.03, 112.05, 112.07, 44.23, 44.37
See application file for complete search history.

(56) References Cited

U.S. PATENT DOCUMENTS

2005/0128896 A1* 6/2005 Katayama ................... 369/44.23
2008/0253263 A1* 10/2008 Komma ................... 369/112.05

FOREIGN PATENT DOCUMENTS

| JP | 2004-5859 | 1/2004 |
| JP | 2004-318958 | 11/2004 |
| JP | 2004318958 A | * 11/2004 |

* cited by examiner

*Primary Examiner* — Joseph Haley
*Assistant Examiner* — Nicholas Lee
(74) *Attorney, Agent, or Firm* — Drinker Biddle & Reath LLP

(57) ABSTRACT

The present invention provides an optical pickup device and optical recording medium information reproduction device that are capable of reproducing information that is recorded on a plurality of kinds of optical discs having different track pitches. With the present invention, an optical pickup device generates a main beam and sub beams that are made up from pairs of semi sub beams, such that the distance in the radial direction between center positions of a pair of semi sub spots on an optical disc where a pair of semi sub beams are formed is an odd multiple of half the track pitch of the optical disc, and the distance in the radial direction between center positions of semi sub spots that correspond to another pair of sub semi sub beams is an odd multiple of half the track pitch of another optical disc.

7 Claims, 13 Drawing Sheets

BEAM ARRANGEMENT ON A DVD-RAM

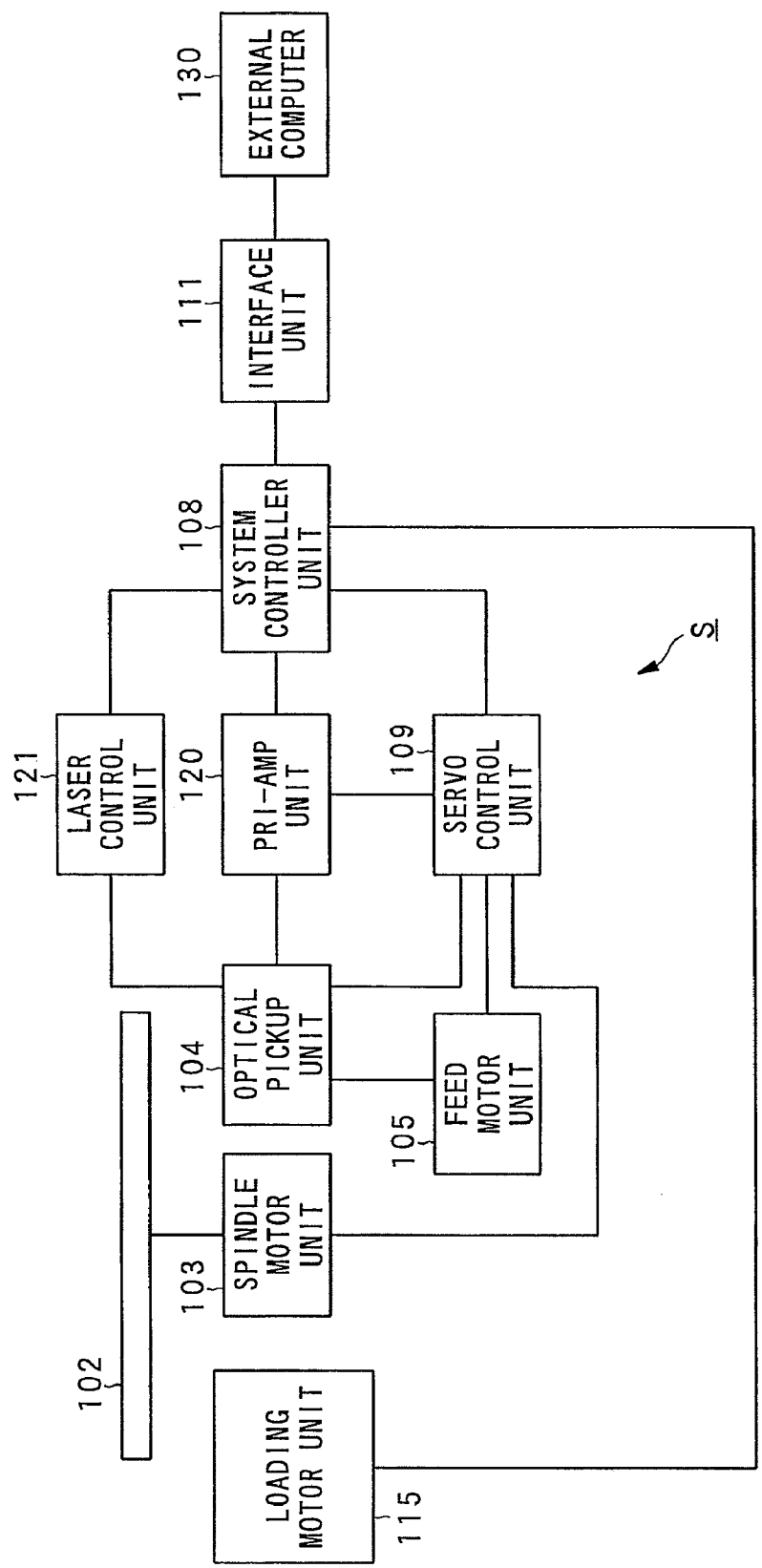

BEAM ARRANGEMENT ON A DVD-RAM

BEAM ARRANGEMENT ON A DVD-R

PP SIGNAL AMPLITUDE IN THE CASE OF A DVD-RAM

BEAM ARRANGEMENT ON A DVD-RAM

BEAM ARRANGEMENT ON A DVD-R

OPTICAL PICKUP DEVICE AND OPTICAL RECORDING MEDIUM INFORMATION REPRODUCTION DEVICE

TECHNICAL FIELD

The present invention relates to an optical pickup device for an optical recording medium, and an optical recording medium information reproduction device.

BACKGROUND ART

An optical disc reproduction device for reproduction of a reproduction-only optical disc is known. When reproduction starts, this optical disc reproduction device drives a laser diode causing it to emit a laser beam. A diffraction grating divides this laser beam into a main beam, which is a zero-order light beam, and two side beams, which are ±1-order light beams, the laser beam is then irradiated onto a polarizing beam splitter. Most of the aforementioned laser beam is P-polarized light, and the polarizing beam splitter is characterized in that it reflects this P-polarized light component and lets a S-polarized light component, which is polarized in a direction orthogonal to the P-polarized light component, pass through. Therefore, the laser beam that is irradiated onto the polarizing beam splitter is reflected by the polarizing beam splitter, is made parallel by a collimator lens, and becomes incident on an object lens. The object lens, causes the incident laser beam to converge into a beam spot having a specified diameter, and irradiates that beam onto an optical disc. When doing this, the main beam is irradiated on the disc so that the center of the beam coincides with the center of the recording track, the +1 order side beam is irradiated on a position that it is shifted ¼ track portion toward the outside of the recording track, and the −1 order side beam is irradiated on a position that is similarly shifted ¼ track portion toward the inside of the recording track. The diffraction grating has spectroscopic characteristics that irradiate each beam in such a state.

Next, when each of the beams is irradiated as described above, reflected light from each beam occurs. Each of the reflected light beams pass through an object lens and collimator lens and become incident on a polarizing beam splitter. That is, the laser beam of the P-polarized light component is reflected by the optical disc such that the light path is reversed, and becomes incident on the polarizing beam splitter as reflected light of an S-polarized component. As described above, the polarizing beam splitter allows the S-polarized light component to pass through. Therefore, each of the reflected light beams that are incident on the polarizing beam splitter pass through that polarizing beam splitter and are irradiated onto a photodetector. The photodetector comprises a first photodetector that receives the reflected light of the main beam, and second and third photodetectors that receives the reflected light of the ±1 order light, respectively. The first photodetector is a 4-way photodetector having four equally divided light-receiving areas A to D, with the light axis of the reflected light of the received main beam in the center, and generates light quantity detection signals that correspond to the amounts of light of the reflected light that is received by each of the light-receiving areas A to D, and supplies these signals to a signal processing system and focus control system. The signal processing system adds all of the light quantity detection signals from each of the light receiving areas A to D to reproduce and output an RF signal that indicates recorded data that is recorded on the optical disc. The focus control system adds each of the light quantity detection signals from the light receiving area A and light receiving area C that are located on the diagonal line, and adds the light quantity detection signals from the light receiving area B and light receiving area D, and by detecting the difference between these added signals, detects focus error by the so-called astigmatic method, and performs focus control of the optical pickup device in accordance to this focus error. The second and third photodetectors receive the reflected +1 order light and the reflected −1 order light, respectively, and supplies the light quantity detection signals that correspond to these reflected light quantities to a tracking control system. The tracking control system detects the difference between each of these light quantity detection signals, and detects tracking error by the so-called three-spot method, then performs tracking control of the optical pickup device in accordance to this tracking error. By doing this, it is possible to reproduce recorded data that is recorded on the optical disc with the laser beam always focused and with the main beam accurately tracing the recording track.

[Patent Document 1] JP2004-318958

DISCLOSURE OF THE INVENTION

Problems to be Solved by the Invention

In recent years there has been a need for increasing the density of optical discs for recording image data such as high-definition still images and video, and in response to this need, high-density optical discs have been developed by narrowing the track pitch. Moreover, in order to improve versatility, it is preferred that devices that reproduce these high-density discs also be capable of reproducing conventional normal-density optical discs.

However, in order to record on or reproduce from an optical disc, it is necessary to perform accurate tracking control. As was described above, tracking error detection by the 3-spot method requires that each side beam be irradiated such that it is deflected a specified amount with respect to the recording track, however, after aligning the positional relationship of each side beam on a high-density disc with a narrow track pitch, the positional relationship of the side beams on a normal-density optical disc with a wide track pitch becomes misaligned. Therefore, as the positional relationship of the side beams on a normal-density optical disc having a wide track pitch become misaligned, there is a problem in that the amplitude of the detected tracking error signal decreases and it becomes difficult to perform accurate tracking error control, which hinders the recording or reproduction of data. In addition, when this occurs, there is a problem in that it is not possible to reproduce a conventional normal-density optical disc with a device for recording and reproducing a high-density disc.

Taking the problems described above into consideration, it is the object of the present invention to provide an optical pickup device that is capable of recording or reproducing a plurality of kinds of optical discs having different track pitches.

Means for Solving the Problems

An optical pickup device in claim 1 of the present invention is provided with: a light emission device for emitting at least one or more light beam; a light focusing device for focusing a light beam that is emitted from the light emission device onto an optical recording medium; a light diffraction device that is located between the light emission device and light focusing device, and that forms the light that is emitted from the light emission device into a main light beam, and at least two or more sub light beams at positions on the optical recording medium on which the main light beam is irradiated that are symmetrical with respect to the main light beam in a direction orthogonal to the direction of a track on which information is recorded; a main light beam receiving device for receiving light of the main beam that is reflected from the optical recording medium; and a sub light beam receiving device for receiving light of the sub light beams that is reflected from the optical recording medium; wherein each of the sub light beam is made up of a pair of semi sub beams such that the distance between the centers of a pair of semi sub spots that are formed on the optical recording medium and that correspond to the pair of semi sub beams that are irradiated on the optical recording device is an odd multiple of the length of approximately half the track pitch length of a first optical recording medium, and the distance in the radial direction of the optical recording medium between the center of a main spot that is formed on the optical recording medium and that corresponds to the main beam and the center of a sub spot made up from the pair of semi sub spots is an odd multiple of the length of approximately half the track pitch length of a second optical recording medium.

An optical recording medium information reproduction device in claim 7 of the present invention is provided with: an optical pickup device of any one of the claims 1 to 6; a servo control unit that performs servo control of the optical pickup device based on the control signal that is generated by the control signal calculation device and electrical signal that is generated by the main beam light receiving device; and an information analysis unit that analyzes information that is recorded on the optical recording medium based on the electrical signal that is output from an electrical signal conversion device of the main light beam receiving device.

BRIEF DESCRIPTION OF THE DRAWINGS

FIG. 1 is a block diagram of an example of the main construction of an optical recording medium information reproduction/recording device of an embodiment of the invention.

DESCRIPTION OF REFERENCE NUMERALS

Figure 2A:
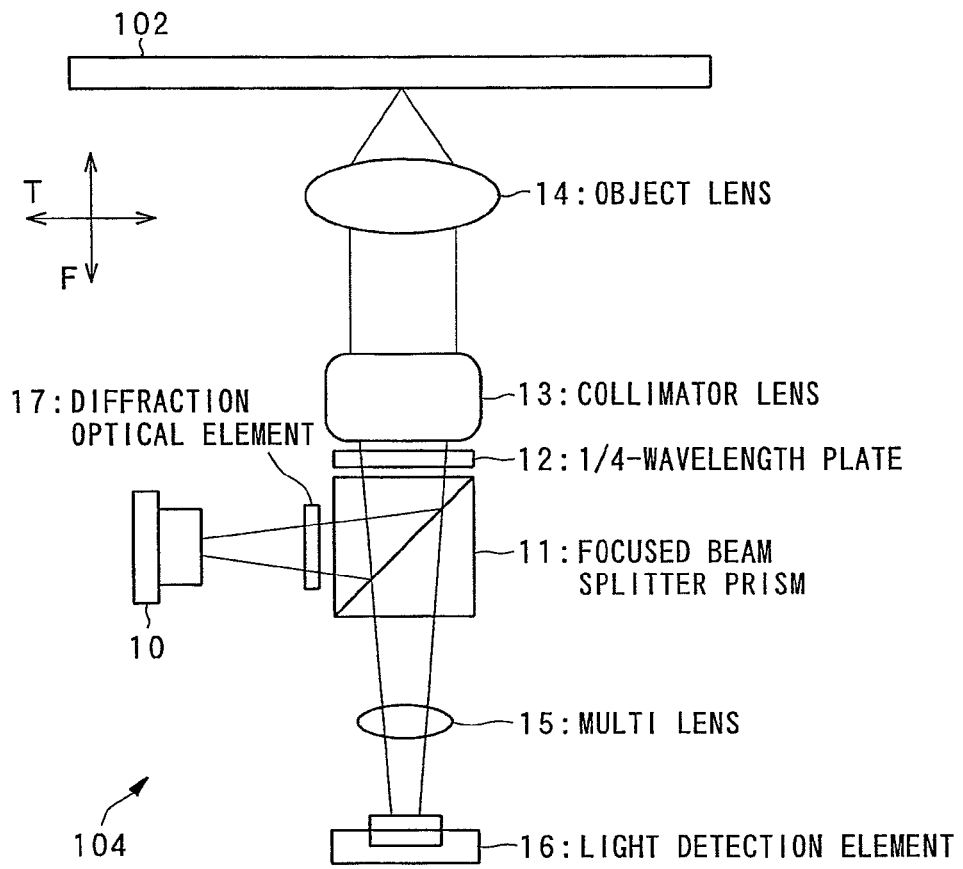
FIG. 2A is a block diagram of an optical pickup device of an embodiment of the invention.

10 . . . semiconductor laser unit
16 . . . Light detection element
17 . . . Diffraction optical element
MB . . . Main spot
SB12,SB34 . . . sub spot
SB1,SB2,SB3,SB4 . . . semi sub spot

BEST MODE FOR CARRYING OUT THE INVENTION

Next, the preferred embodiments of the invention will be explained based on the supplied drawings.

(I) Overall Construction and Operation

First, the overall construction of an optical recording medium information recording/reproduction device S that includes the optical pickup device of the embodiments of the invention will be explained using FIG. 1. Also, an optical pickup device of the embodiments of the invention will be explained using FIG. 2. Moreover, the relationship between a light beam and a diffraction optical element, which is a light diffraction means, will be explained using FIG. 3. Furthermore, the construction of the diffraction optical element will be explained using FIG. 3.

The optical recording medium information recording/reproduction device of the embodiments of the invention is an optical recording medium information recording/reproduction device that records information signals on or reproduces information signals from an optical disc that is selected from a plurality of different types of optical discs.

The optical recording medium information recording/reproduction device S that is shown in FIG. 1 comprises: a spindle motor unit 103 that rotates an optical disc, which is the optical recording medium; an optical pickup unit 104; a feed motor unit 105 that moves the optical pickup in the radial direction of the optical recording medium; a loading motor unit 115 that performs the operation of loading the optical disc 102 into or ejecting the optical disc 102 from the optical recording medium information recording/reproduction device S; a servo control unit 109 that performs servo control of the spindle motor unit 103, optical pickup unit 104 and feed motor unit 105; a laser control unit 121 that controls at least one or more semiconductor laser that is located in the pickup unit 104; a preamp unit 120 that performs various operations together with amplifying electrical signals that are output from the optical pickup unit 104; and a system controller unit 108 that outputs a laser control signal to the laser control unit 121, demodulates the electrical signal that is input from the preamp unit 120 and converts the signal to normal data format, then outputs that converted data signal to an interface unit 111, and outputs control signals to the servo control unit 109 and loading motor unit 115.

Each of the blocks will be explained below.

The spindle motor unit 103 is driven and controlled by the system controller unit 108 and servo control unit 109, and is driven at a specified rpm to correspond with the type of optical disc 102.

Various formats (including so-called 'phase-change recording', 'dye recording', 'magneto-optic recording') of optical discs (CD (Compact Disc)-R (Recordable)/RW (Rewritable), CD-ROM (Read Only Memory), CD-DA (Digital Audio), DVD (Digital Versatile Disc)-RAM (Random Access Memory, DVD-R/RW, DVD+RW, DVD-R/RW, etc.) that are recordable/reproducible discs that use optical modulation recording, or various magneto-optical recording media can be used as the optical disc 102.

It is also possible to use a multi-layered optical disc having two or more recording layers or reproduction layers as the optical disc 102.

In order to record data on or reproduce data from these optical discs, the optical recording medium information reproduction/recording device S comprises an optical pickup unit 104 that has a semiconductor laser having at least one or more wavelengths. For example, wavelengths of approximately 405 nm, 650 nm or 780 nm are used. It is also possible to have a pickup unit for each wavelength, or to have parts of the pickup unit for each wavelength.

There is a laser control unit (not shown in the figure) in the optical pickup unit 104 that controls the semiconductor laser of the optical pickup unit 104. The laser control unit changes the output power of the laser source for the recording mode and reproduction mode. In addition, when necessary, the laser control unit controls the output power of the laser source so that it differs to correspond to the type of optical disc 102.

The optical pickup unit 104 irradiates a light beam onto a recording layer of the optical disc 102 and detects light from that light beam that is reflected from the recording layer. Also, based on the reflected light from the recording layer of the optical disc 102, the optical pickup unit 104 detects various kinds of light beams as will be described later, and provides signals to the preamp unit 120 that correspond to each light beam.

Moreover, the optical pickup unit 104 follows an instruction from the system controller unit 108 to irradiate a light beam onto the recording layer of the rotating optical disc 102. By irradiating a light beam in this way, data information is recorded on or reproduced from the optical disc 102.

The feed motor unit 105 moves the optical pickup 104 over the optical disc 102 to a predetermined track based on a signal from the servo control unit 109.

The servo control unit 109 controls the spindle motor unit 103, controls the feed motor unit 105, and performs control to drive a two-axis actuator that holds an object lens, which is the light focusing means in the optical pickup unit 104, in the focusing direction and tracking direction.

Furthermore, the optical pickup unit 104 is such that by driving the two-axis actuator based on the servo control signal, the object lens (not shown in the figure) or the like is moved so that the focal point of light beam that is emitted from the optical pickup moves over the recording layer of the optical recording medium.

The preamp unit 120 generates a focus error signal, track error signal and RF signal based on signals that correspond to each light beam. The output signals from the preamp unit 120 are input to the system controller 108.

The system controller unit 108 performs specified processing of the signal that are input from the preamp unit 120 such as demodulation, and error correction.

In the system controller unit 108, when the information recorded on the optical disc 102 is information for computer data storage, the demodulated signal is output to an external computer 130 via the interface unit 111. The external computer 130 can receive the signals recorded on the optical disc 102 as data information.

When the information that is recorded on the optical disc 102 is so-called audio information or video information, a D/A (Digital-to-Analog) conversion unit (not shown in the figure) converts the output signal from the system controller unit 108 from a digital signal to an analog signal and outputs that signal to an audio/video information processing unit (not shown in the figure). Signal processing is then performed on the signal that is input to the audio/video information processing unit and output to external speakers or video viewing device.

Next, the optical pickup unit 104 will be explained in detail based on FIGS. 2A, 2B.

Figure 2B:
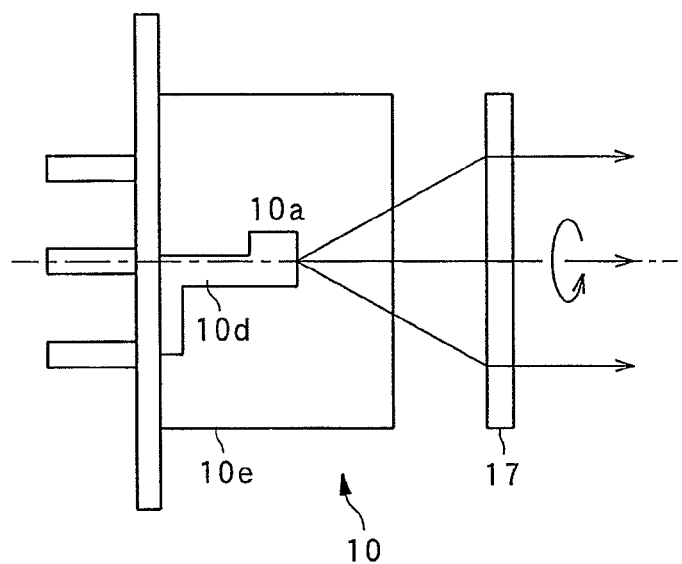
FIG. 2B is a drawing showing the positional relationship between a semiconductor laser and diffraction grating.

Each of the optical components that are shown in FIGS. 2A, 2B are constructed so that they are separately mounted and supported in an optical block unit (not shown in the figure).

The optical pickup unit 104 comprises a semiconductor laser unit 10, which functions as light emitting means. This semiconductor laser unit 10 has at least one light source for emitting a light beam.

When using the optical pickup unit 104 to write an information signal to or write an information signal from an optical recording medium, each light beam that is emitted from the semiconductor laser unit 10 enters a polarizing beam splitter prism 11, where nearly all of the light quantity is reflected and enters a ¼ wavelength plate 12. The light beam that enters the ¼ wavelength plate 12 passes through this ¼ wavelength plate 12 and becomes circularly polarized, after which it becomes parallel by passing through a collimator lens 13 and then enters into an object lens 14.

The object lens 14 is supported by a two-axis actuator (not shown in the figure) so that it can be moved in the focus direction indicated by arrow F in FIG. 2A and in the tracking direction indicated by arrow T in FIG. 2A, and this object lens focuses the incident light beams onto the signal recording surface of the optical disc 102.

The light beam that is irradiated on the signal recording surface of the optical disc 102 and reflected by the signal recording surface passes through the object lens 14, collimator lens 13 and ¼ wavelength plate 12 to become linearly-polarized light, then enters the polarizing beam splitter prism 11. In this polarizing beam splitter prism 11, nearly all of the light quantity of the reflected light beam is allowed to pass and becomes separated from the light path returning to the semiconductor laser 10, after which it passes through a multi-lens 15 and enters a light detection element 16, which is a light receiving means and light receiving surface conversion means. The multi-lens 15 is a lens that is a combination of a concave surface and cylindrical surface, and together with lengthening the distance to the focal point of the reflected light beam, causes an astigmatism to occur in the reflected light beam.

Next, the relationship between the semiconductor laser unit 10 and diffraction optical element 17 will be explained using FIG. 3.

Figure 3:
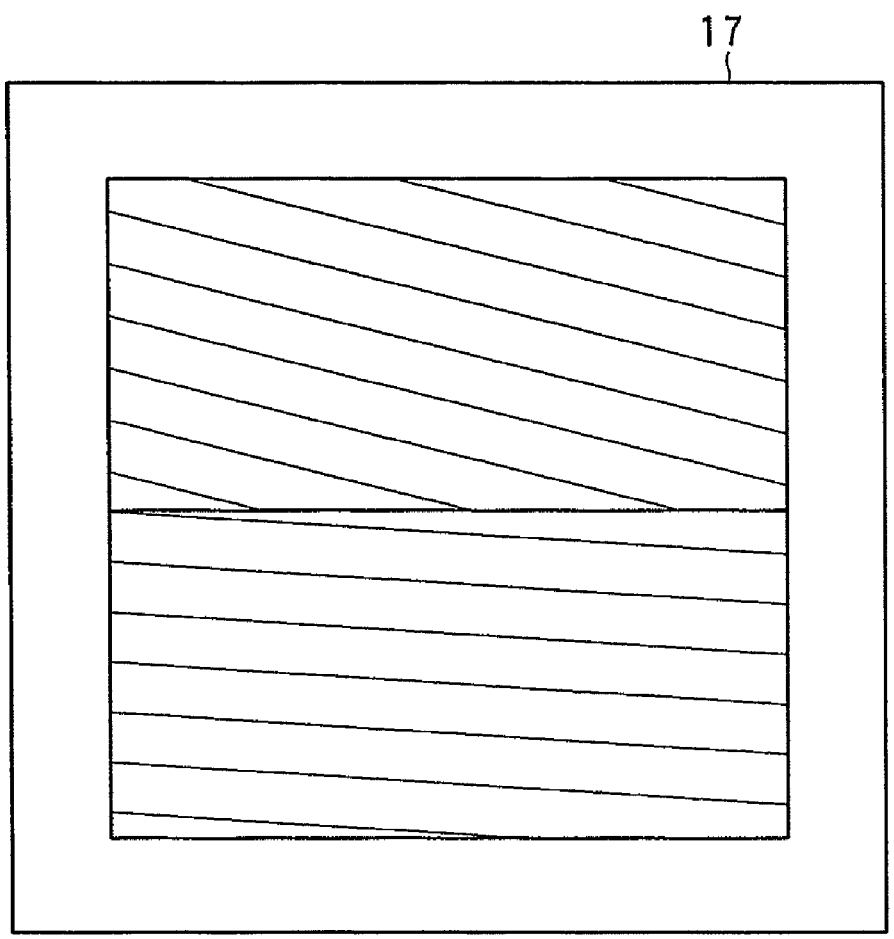
FIG. 3 is a block diagram showing an example of a diffraction grating of an embodiment of the invention.

In FIG. 3, in order to simplify the explanation, only one light source 10*a* will be explained. It is possible to arrange light sources having a plurality of different frequencies as explained above in the vicinity of light source 10a.

The light source 10a is supported by a supporting unit 10 and housed inside a package 10e.

The light beam that is emitted from this light source 10 is diffracted by a diffraction optical element 17 and separated into a 0-order light beam and ±1-order diffracted light beams.

Of these, the 0-order light beam is emitted from the light source 10a and advances as is and becomes the main light beam that forms a main spot on the recording track for recording an information signal on or reproducing an information signal from the optical disc 102. The +1-order diffracted light beam becomes a first sub light beam that forms a first sub spot. The −1-order diffracted light beam becomes a second sub light beam that forms a second sub spot.

Furthermore, the first and second sub light beams are diffracted by the diffraction optical element 17 and are separated into pairs of semi sub light beams that form pairs of semi sub spots at positions that are shifted in the direction that is orthogonal to the recording track.

In order to separate the light beam that is emitted from the light source 10a into five light beams in this way, a hologram optical element as shown in FIG. 3 may be used for the diffraction optical element 17.

Figure 5:
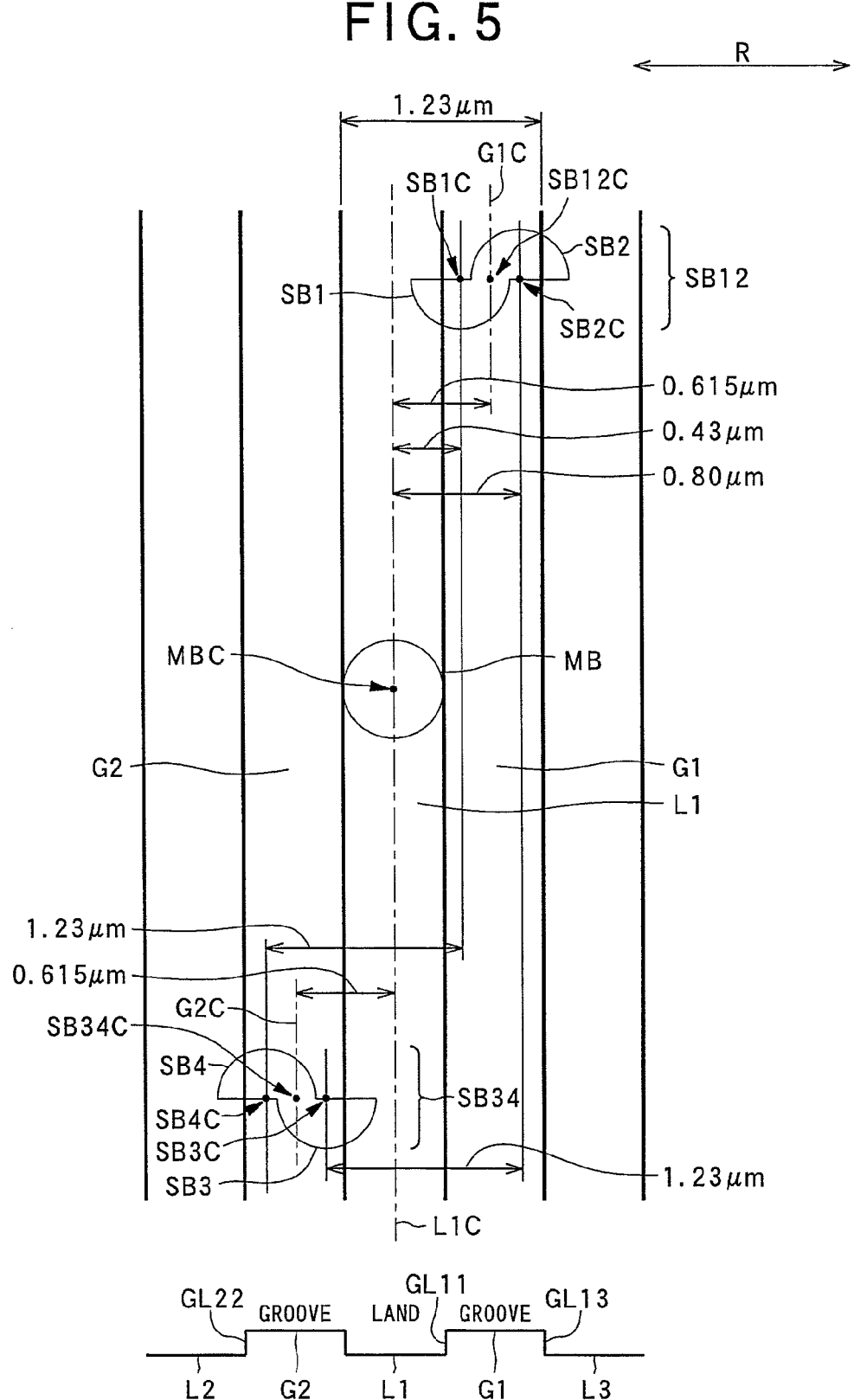
FIG. 5 is a drawing showing the shapes and positional relationship of a main spot, sub spot and semi sub spot on a DVD-RAM track of a first embodiment of the invention.

This hologram optical element forms a hologram pattern in which the directions of the grating patterns on both sides of the boundary line in the center of the element are asymmetric. This causes the first and second sub spots to be formed on the signal recording surface of the optical disc 102 at positions separated from each other on both sides of the main spot on the recording track as shown in FIG. 5; and these first and second sub spots each form a pair of semi-circular semi sub spots at positions that are shifted in directions orthogonal to the recording track. The distances between the centers of each pair of semi sub spots in the direction orthogonal to the recording track are set so that when the track pitch of the optical disc is Tp, they become approximately Tp/2.

In other words, in the case of a CD, the track pitch Tp is 1.6 μm, so the distance between the centers of a pair of semi sub spots in the direction orthogonal to the recording track becomes approximately 0.8 μm. Moreover, in the case of a DVD±R, the track pitch Tp is 0.74 μm, so the distance between the centers of a pair of semi sub spots in the direction orthogonal to the recording track becomes approximately 0.37 μm. Furthermore, in the case of a DVD-RAM, the track pitch Tp is 1.23 μm, so the distance between the centers of a pair of semi sub spots in the direction orthogonal to the recording track becomes approximately 0.615 μm.

In addition, by rotating this diffraction optical element 17 around the optical axis, it becomes possible to change the positional relationship of each of the sub spots with the main spot on the recording track of the optical disc 102 without causing the focus position of the main spot to fluctuate.

Also, when the track pitch of the optical disc 102 is taken to be Tp and n is an odd number of 1 or more, the distance between the center of the main spot and the centers of the pair of sub spots in the direction orthogonal to the recording track (in this case, the distance between the center of the pair of semi sub spots and the center of the main spot) is set such that it becomes n·Tp/2 or n·Tp/4.

More specifically, in the embodiments of the present invention, a DVD-RAM will be considered as a reference for the optical disc 102, so the distance between the center of the main spot and the centers of a pair of sub spots in the direction that is orthogonal to the recording track is set to approximately 0.615 μm. The track pitch of a DVD-RAM is 1.23 μm, and the value that is obtained by multiplying half of that, 0.615 μm, by 1 (n=1) is used.

The track pitch (Tp) that is explained here is the distance 'from land to the next land' (or is the distance from a groove to the next groove).

Figure 4:
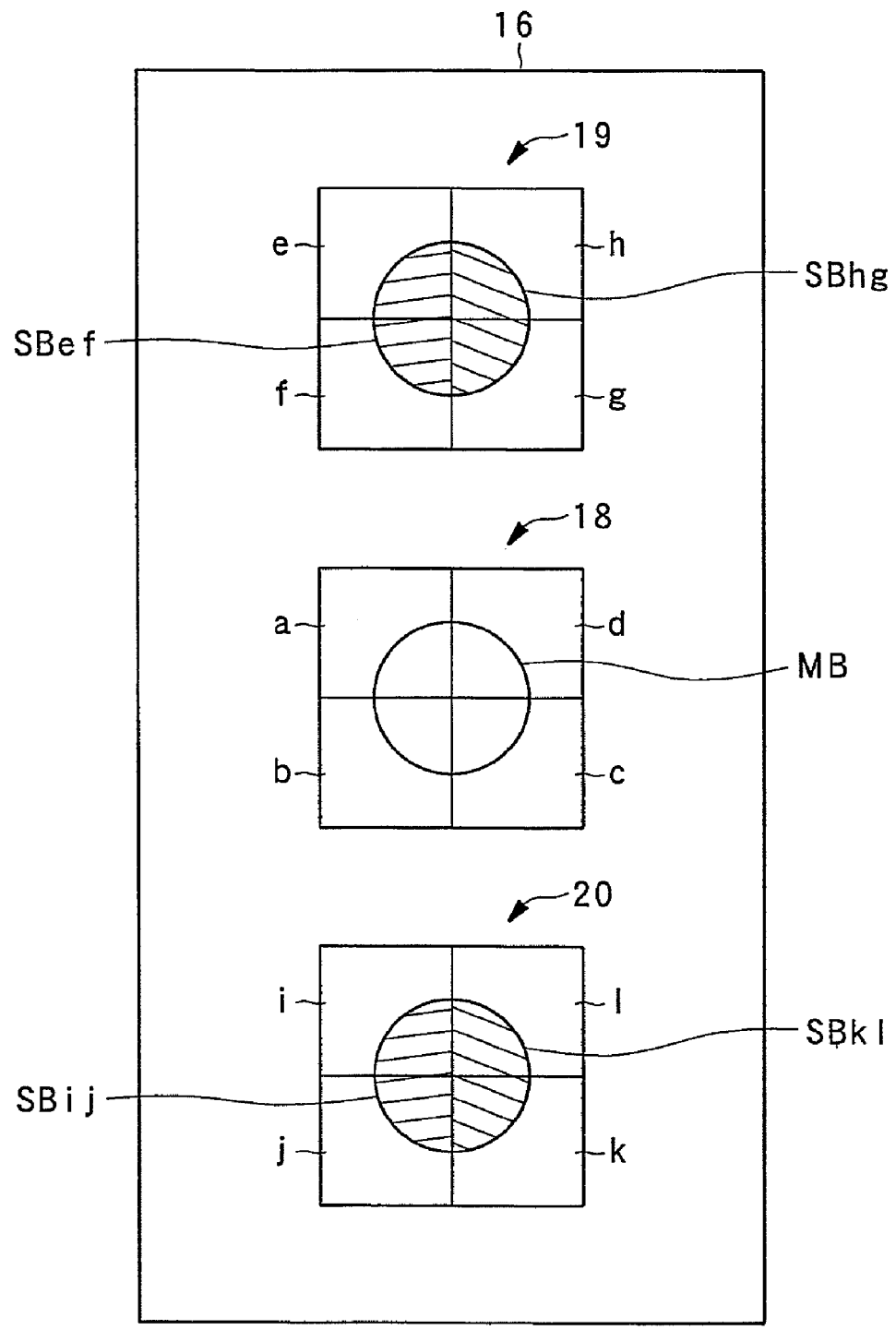
FIG. 4 is a block diagram showing the positional relationship between the light receiving section of a light detection element and a spot.

The positional relationship of the main spot, sub spots and semi sub spots that are formed on the optical disc 102 and each light receiving section of a light detection element 16 will be explained using FIG. 4.

The light detection element 16 comprises: a main light receiving section 18 that receives the main reflected light beam from the main spot; a first sub light receiving section 19 that receives a first sub reflected light beam from the first sub spot; and a second sub light receiving section 20 that receives a second sub reflected light beam from the second sub spot.

The first sub light receiving section 19 has four separated light receiving surfaces e, f, g, h that are separated by a separation line that corresponds to the direction parallel with the recording track, and a separation line that corresponds to the direction orthogonal to the recording track, and these four light receiving surfaces e, f, g, h are arranged so they spread out radially from a center section, and each outputs an independent light detection signal e, f, g, h.

The reflected light from the first semi sub spot SBhg of the first sub spot is formed on light receiving surfaces h and g. Reflected light that corresponds to the portions of the first semi sub spot SBhg of the first sub spot formed on the optical disc that is divided in two in the radial direction is irradiated onto the light receiving surface h and light receiving surface g.

Similarly, the reflected light from the second semi sub spot SBef of the second sub spot is formed on light receiving surfaces e and f. Reflected light that corresponds to the portions of the second semi sub spot SBef of the second sub spot formed on the optical disc that is divided in two in the radial direction is irradiated onto the light receiving surface e and light receiving surface f.

The second sub light receiving section 20 has four separated light receiving surfaces i, j, k, l that are separated by a separation line that corresponds to the direction parallel with the recording track, and a separation line that corresponds to the direction orthogonal to the recording track, and these four light receiving surfaces i, j, k, l are arranged so they spread out radially from a center section, and each outputs an independent light detection signal i, j, k, l.

The reflected light from the first semi sub spot SBij of the first sub spot is formed on light receiving surfaces i and j. Reflected light that corresponds to the portions of the first semi sub spot SBij of the first sub spot formed on the optical disc that is divided in two in the radial direction is irradiated onto the light receiving surface i and light receiving surface j.

Similarly, the reflected light from the second semi sub spot SBkl of the second sub spot is formed on light receiving surfaces k and l. Reflected light that corresponds to the portions of the second semi sub spot SBkl of the second sub spot formed on the optical disc that is divided in two in the radial direction is irradiated onto the light receiving surface k and light receiving surface l.

The preamp unit 102 performs current-to-voltage conversion and other processing of the light detection signal that is output from the light detection element 16 and then outputs the signal to the system controller unit 108.

The first sub spot and second sub spot described above are names given for convenience of the explanation, and by rotating the diffraction grating, it is possible to rotate the positional relationship of the first sub spot and second sub spot by 180 degrees. In that case, the reflected light that corresponds to the first sub spot is irradiated on the sub light receiving section 20, and the reflected light that corresponds to the second sub spot is irradiated on the sub light receiving section 19.

The center position of the pair of semi sub spots that make up one sub spot is nearly the same position for both the sub light receiving section 19 and sub light receiving section 20 of the light receiving element 16.

(II) First Embodiment

Next, a first embodiment of the present invention will be explained using FIG. 5 to FIG. 9. This embodiment will be explained for an optical pickup device that, having been set at the time of shipping, is capable of reproduction and recording of an optical disc such as a DVD-R having a track pitch of 0.74 µm, or a optical disc such as a DVD-RAM having a track pitch of 1.23 µm.

First, the positional relationship of the main spot, sub spots and semi sub spots that are formed on an optical disc will be explained.

In this embodiment, a semi sub spot has a semi circular shape, however the shape could be any arbitrary shape.

(II-1) The Embodiment in the Case of a DVD-RAM Disc

FIG. 5 is a drawing showing the shapes and positional relationship of a main spot MB, sub spot SB12, sub spot SB34, sub spot SB12, semi sub spot SB1 and semi sub spot SB2 that make up sub spot SB12, and semi sub spot SB3 and semi sub spot SB4 that make up sub spot SB34 when the embodiment is applied to a DVD-RAM (optical disc having a track pitch of 1.23 µm).

FIG. 5 shows the case in which the center MBC of the main spot MB is located on the centerline L1C in the radial direction of the land track L1 (width 0.615 µm).

In this case, the position of the center point SB1C of the semi circular semi sub spot SB1 is at a position shifted 0.43 µm in the radial direction R from the centerline L1C of the land track L1.

Moreover, the position of the center point SB2C of the semi circular semi sub spot SB2 is at a position shifted 0.80 µm in the radial direction R from the centerline L1C of the land track L1.

Therefore, the distance in the radial direction R between the position of the center point SB1C of the semi circular semi sub spot SB1 and the position of the center point SB2C of the semi circular semi sub spot SB2 is 0.37 µm (0.80 µm−0.43 µm). The distance 0.37 µm is half the track pitch 0.74 µm of a DVD disc such as a DVD-R or DVD-RW.

In other words, the distance between the position of the center point SB1C of the semi circular semi sub spot SB1 and the position of the center point SB2C of the semi circular semi sub spot SB2 is a distance that corresponds to half the track pitch of an optical disc such as a DVD-R.

Furthermore, the center position SB12C of the sub spot SB12 that is made up from semi circular semi sub spot SB1 and semi circular semi sub spot SB2 is formed at a position that is shifted 0.615 µm in the radial direction R from the centerline L1C of the land track L1. The distance 0.615 µm is the value of half the track pitch 1.23 µm of a DVD-RAM.

Therefore, the center position SB12C of the sub spot SB12 is located on the centerline G1C of the groove track.

Moreover, the position of the center point SB1C of the semi circular semi sub spot SB1 and the position of the center point SB2C of the semi circular semi sub spot SB2 are formed at symmetrical positions in the radial direction R with respect to the centerline G1C of the groove track G1.

Also, the reflected light intensities of the light reflected from the optical recording medium at the semi sub spot SB1 and semi sub spot SB2 have the same maximum intensity, however, the phase of the signals is different (the phase differs by approximately 54.1 degrees). In addition, the push-pull signal from semi sub spot SB1 and the push pull signal from semi sub spot SB2 are such that the reflected light intensities from the optical recording medium have the same maximum value, however are signals having different phase (the phase differs by approximately 108 degrees).

Next, semi sub spot SB3, semi sub spot SB4 and sub spot SB34 that is made up from semi sub spot SB3 and semi sub spot SB4 will be explained.

Semi sub spot SB3 and semi sub spot SB4 are formed at positions symmetrical with semi sub spot SB1 and semi sub spot SB2 in the radial direction R with respect to the centerline LC1 of the land track L1. Moreover, sub spot SB34 that is made up from semi sub spot SB3 and semi sub spot SB4 is formed.

The position of the center point SB3C of the semi circular semi sub spot SB3 is formed at a position that is separated 0.43 µm in the radial direction R from the centerline L1C of the land track L1 opposite that of the semi sub spot SB1.

Also, the position of the center point SB3C of the semi circular semi sub spot SB3 is formed at a position separated 0.80 µm in the radial direction R from the centerline L1C of the land track L1 opposite that of the semi sub spot SB2.

Therefore, the distance between the position of the center point SB3C of the semi circular semi sub spot SB3 and the position of the center point SB4C of the semi circular semi sub spot SB4 is 0.37 µm (0.80 µm−0.43 µm).

In other words, the distance between the position of the center point SB3C of the semi circular semi sub spot SB3 and the position of the center point SB4C of the semi circular semi sub spot SB4 is a distance that corresponds to half the track pitch of an optical disc such as a DVD-R.

Moreover, the center position SB34C of the sub spot SB34 that is made up from the semi circular semi sub spot SB3 and semi circular semi sub spot SB4 is formed at a position that is separated 0.615 µm in the radial direction from the centerline L1C of the land track L1 opposite that of the sub spot SB121. The distance 0.615 µm is a value that is half the track pitch 1.23 µm of a DVD-RAM.

Therefore, the center position SB34C of the sub spot SB34 is located on the centerline G2C of the groove track G2.

In addition, the position of the center point SB3C of the semi circular semi sub spot SB3 and the position of the center point SB4C of the semi circular semi sub spot SB4 are formed at symmetrical positions in the radial direction R with respect to the centerline G2C of the groove track G2.

Therefore, the intensities of the reflected light that is reflected from the optical recording medium at semi sub spot SB3 and semi sub spot SB4 have the same maximum intensity, however, are signals having different phase (the phase differs by approximately 108 degrees). Moreover, the push-pull signal from semi sub spot SB3 and the push-pull signal from semi sub spot SB4 have the same maximum value for the reflected light intensity from the optical recording medium, however the phase is different (the phase differs by approximately 108 degrees).

Next, the relationship between the semi circular semi sub spot SB1 and semi circular semi sub spot SB4 will be explained.

The distance between the position of the center point SB1C of the semi circular semi sub spot SB1 and the position of the center point SB4C of the semi circular semi sub spot SB4 is 1.23 μm. The distance 1.23 μm is the same value as the track pitch 1.23 μm of a DVD-RAM.

Therefore, when the center point SB1C of the semi circular semi sub spot SB1 is located on the groove track G1 of a DVD-RAM, the center point SB4C of the semi circular semi sub spot SB4 is located on the groove track G2 of that DVD-RAM.

In this case, the center point SB1C of the semi circular semi sub spot SB1 is formed at a position that is separated 0.1225 μm from the boundary position LG11 between the land track L1 and groove track G1. Similarly, the center point SB4C of the semi circular semi sub spot SB4 is formed at a position that is separated 0.1225 μm from the boundary position LG22 between the land track L2 and groove track G2.

Therefore, the intensities of the reflected light that is reflected from the optical recording medium at semi sub spot SB1 and semi sub spot SB4 are the same, and the signals have the same phase.

In other words, the push-pull signal from semi sub spot SB2 and the push-pull signal from semi sub spot SB3 have the same signal intensity and are in-phase signals having the same phase.

Next, the relationship between semi circular semi sub spot SB2 and semi circular semi sub spot SB3 will be explained.

The distance between the position of the center point SB2C of semi circular semi sub spot SB2 and the position of the center point SB3C of semi circular semi sub spot SB3 is 1.23 μm.

Therefore, when the center point SB2C of semi circular semi sub spot SB2 is located on the groove track G1 of the DVD-RAM, the center point SB3C of semi circular semi sub spot SB3 is located on the groove track G2 of that DVD-RAM.

In this case, the center point SB2C of semi circular semi sub spot SB2 is formed at a position that is separated 0.1225 μm from the boundary position GL13 between the groove track G1 and land track L3 (in the direction toward the main spot in the radial direction R from the boundary position GL13). Similarly, the center point SB3C of semi circular semi sub spot SB3 is formed at a position that is separated 0.1225 μm from the boundary position GL21 between the groove track G2 and land track L1 (in the direction going away from the main spot in the radial direction R from the boundary position GL21).

Therefore, the intensities of the reflected light that is reflected from the optical recording medium at semi sub spot SB2 and semi sub spot SB3 are the same, and the signals have the same phase.

In other words, the push-pull signal of semi sub spot SB2 and the push-pull signal of semi sub spot SB3 are in-phase signals having the same signal intensity and phase.

Moreover, semi sub spot SB1 and semi sub spot SB2 are located at symmetric locations with respect to the centerline G1C of the groove track G1. Furthermore, semi sub spot SB3 and semi sub spot SB4 are located at symmetric locations with respect to the centerline G2C of the groove track G2.

Also, semi sub spot SB2 and semi sub spot SB3 are located in the same direction in the radial direction R with respect to the centerlines (G1C, G2C) of the respective groove tracks. Similarly, semi sub spot SB1 and semi sub spot SB4 are located in the same direction in the radial direction R with respect to the centerlines (G1C, G2C) of the respective groove tracks.

Therefore, the signal resulting from adding the push-pull signal of semi sub spot SB1 and the push-pull signal of semi sub spot SB2, and the signal resulting from adding the push-pull signal of semi sub spot SB3 and the push-pull signal of semi sub spot SB4 are signals having the same signal intensity and phase.

Furthermore, the signal resulting from the overall sum of the push-pull signals of each of the semi sub spots (SB1, SB2, SB3 and SB4) becomes a signal having the same phase but greater signal intensity (signal amplitude) than the signal resulting from adding the push-pull signal of semi sub spot SB1 and the push-pull signal of semi sub spot SB2, and the signal resulting from adding the push-pull signal of semi sub spot SB3 and the push-pull signal of semi sub spot SB4.

[Correlation Between Semi Sub Spots, Sub Spots and the Main Spot and the Light Receiving Sections]

Figure 6:
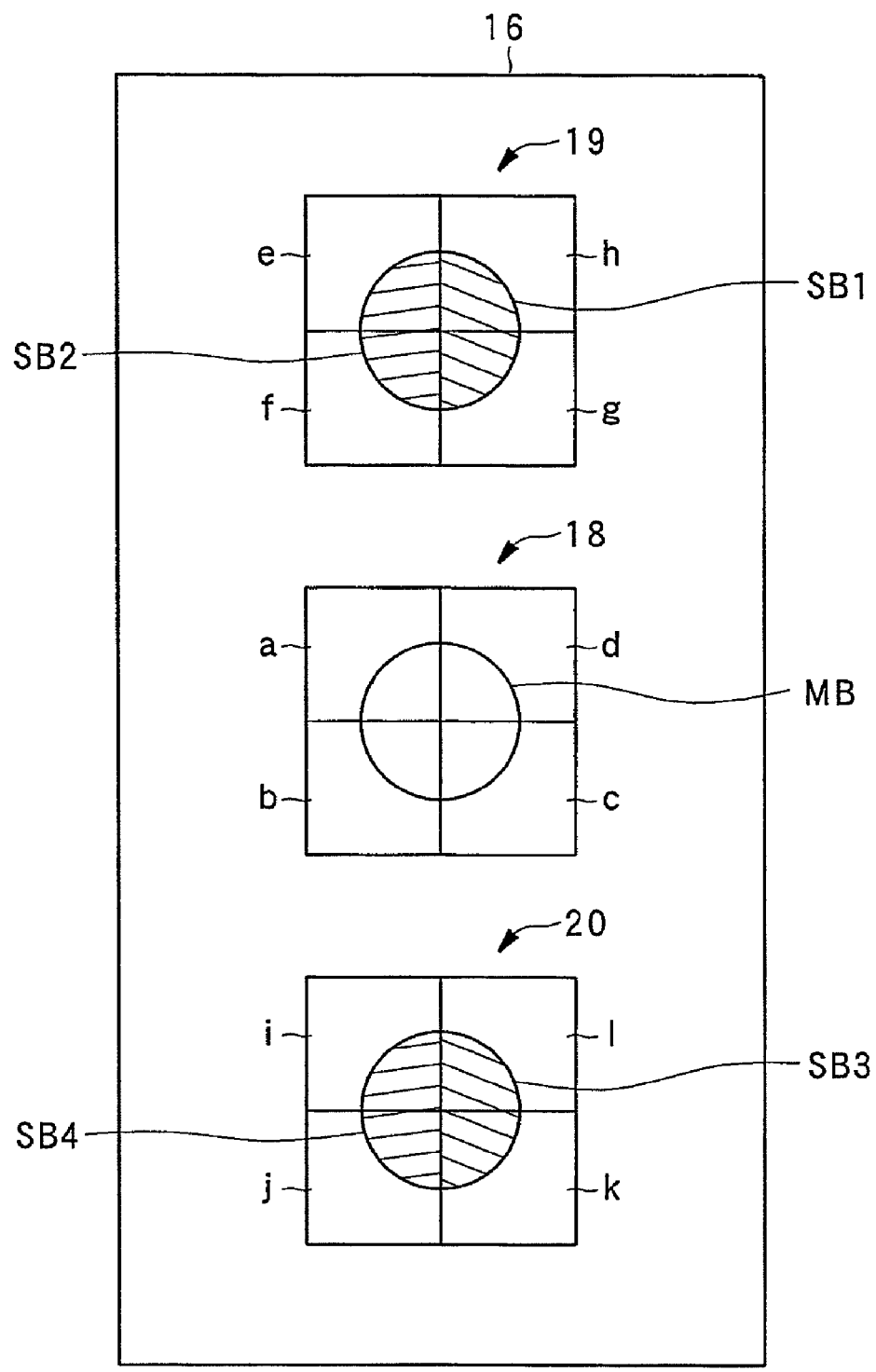
FIG. 6 is block diagram showing the positional relationship of the reflected light from a semi sub spot SB1, semi sub spot SB2, semi sub spot SB3 and semi sub spot SB4 and a light detection element 16.

Next, an example of which part on the light detection element 16 the light that is reflected from semi sub spot SB1, semi sub spot SB2, semi sub spot SB3 and semi sub spot SB4 is irradiated will be explained using FIG. 6.

The main spot MB is irradiated on the main light receiving section 18. Semi sub spot SB1 is irradiated on light receiving surfaces h and g. Also, semi sub spot SB2 is irradiated on light receiving surfaces e and f.

Light receiving surface e and light receiving surface h are sections of the semi circular sections that are divided in the track direction of semi sub spots SB1 and SB2 on the optical disc 102 and that are close in the radial direction R to the main spot.

Light receiving surface f and light receiving surface g are sections of the semi circular sections that are divided in the track direction of semi sub spots SB1 and SB2 on the optical disc 102 and that are far in the radial direction R from the main spot.

This is because the reflected light from semi sub spot SB1 and semi sub spot SB2 passes through the multi-lens 15.

Moreover, semi sub spot SB3 is irradiated on light receiving surfaces l and k, and semi sub spot SB4 is irradiated on light receiving surfaces i and j.

Light receiving surface j and light receiving surface k are sections of the semi circular sections that are divided in the track direction of semi sub spots SB3 and SB4 on the optical disc 102 and that are close in the radial direction R to the main spot.

Light receiving surface i and light receiving surface l are sections of the semi circular sections that are divided in the track direction of semi sub spots SB3 and SB4 on the optical disc 102 and that are far in the radial direction R from the main spot.

This is because the reflected light from semi sub spot SB3 and semi sub spot SB4 passes through the multi-lens 15.

In the explanation of the embodiment above, the case was explained in which after the reflected light from semi sub spot SB1, semi sub spot SB2, semi sub spot SB3 and semi sub spot SB4 passes through the multi-lens 15, the relationship of the light receiving surface h, f and e, j is reversed, however, it is also possible for the relationship of the light receiving surfaces e, g and i, k to be reversed according to the direction of the astigmatism that is added by the multi-lens 15.

Next, the relationship between the signals from each of the light receiving surfaces and the tracking error signal will be explained.

The signals that are output from light receiving surface a to l are taken to be signals Ia to Il.

The push-pull signal SB1*pp* from the reflected light of semi sub spot SB1 is indicated by Ih-Ig. Also, the push-pull signal SB2*pp* from the reflected light of semi sub spot SB2 is indicated by Ie-If.

Similarly, the push-pull signal SB3*pp* from the reflected light of semi sub spot SB3 is indicated by Il-Ik, and the push-pull signal SB4*pp* from the reflected light of semi sub spot SB4 is indicated by Ii-Ij.

Furthermore, The push-pull signal MBpp from the reflected light of the main spot is indicated as (Ia+Id)−(Ib+Ic).

Here, the tracking error signal DPPTRE for a DVD-RAM is expressed by Equation 1 below.

$$DPPTRE = MBpp - k(SB1pp + SB2pp + SB3pp + SB4pp)$$ Equation 1

(k is a constant.)

The distance between the center position MBC of the main spot and the center position SB12C of the sub spot SB12 is half (0.615 μm) the track pitch of a DVD-RAM, so MBpp and SB1*pp*+SB2*pp* have a reverse phase relationship.

Moreover, the distance between the center position MBC of the main spot and the center position SB34C of the sub spot SB34 is half (0.615 μm) the track pitch of a DVD-RAM, so MBpp and SB3*pp*+SB4*pp* have a reverse phase relationship.

Therefore, MBpp and SB1*pp*+SB2*pp*+SB3*pp*+SB4*pp* are in a reverse phase relationship, so compared with when the DPPTRE signal is just from the main spot, it is possible to obtain a signal having a larger amplitude and better sensitivity.

Moreover, the tracking signal uses the difference between MBpp and SB1*pp*+SB2*pp*+SB3*pp*+SB4*pp*, so it is possible to eliminate any adverse affects that occur when the light axis of the object lens is offset, or when the optical disc is inclined.

[Change in the Push-Pull Signals of the Semi Sub Spots]

Figure 8:
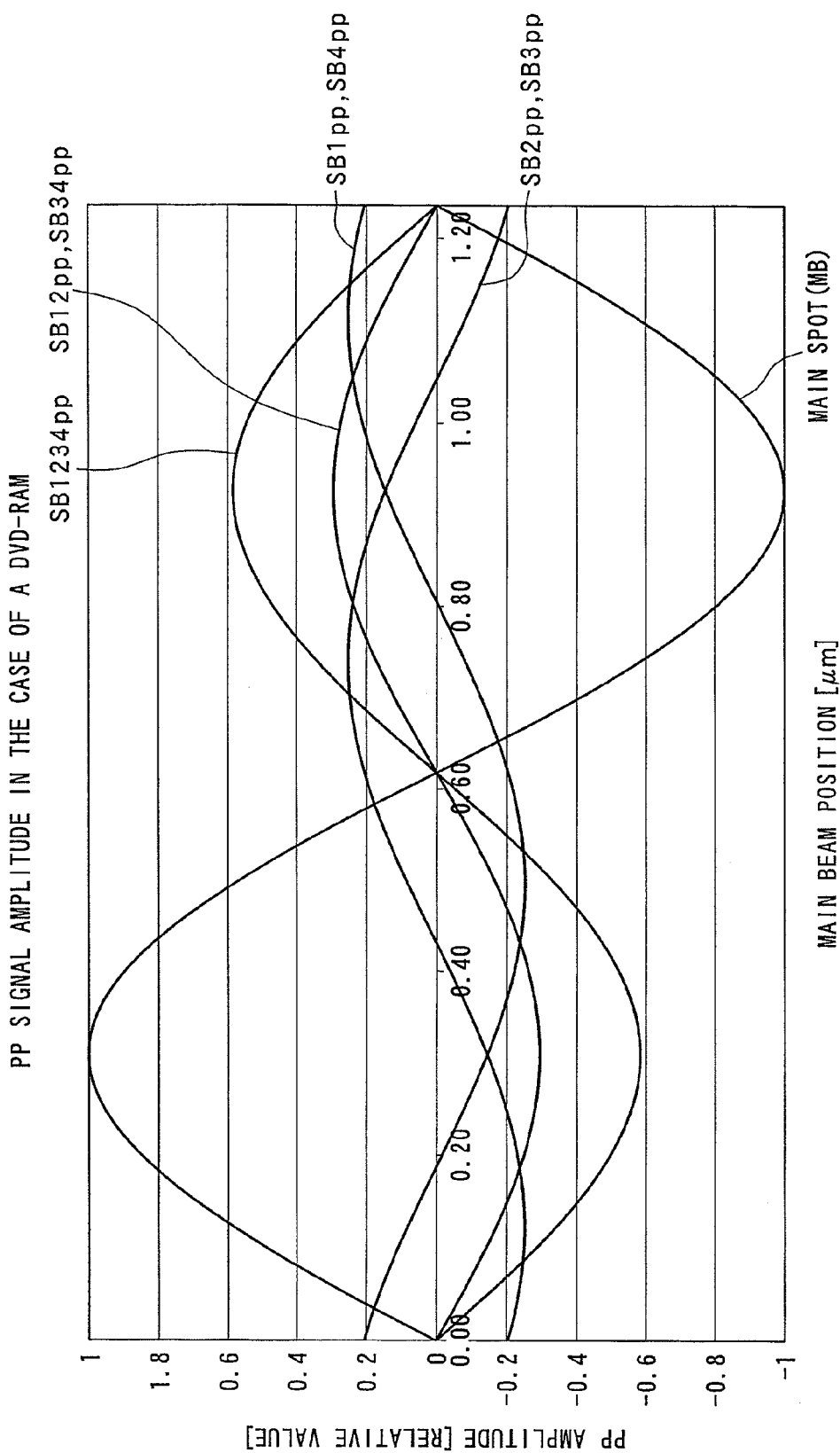
FIG. 8 is a drawing that shows the change in semi spot push-pull signals of a DVD-RAM of a first embodiment of the invention.

Next, FIG. 8 explains the changes in the push-pull signal SB1*pp* of semi sub spot SB1, push-pull signal SB2*pp* of semi sub spot SB2, push-pull signal SB3*pp* of semi sub spot SB3, push-pull signal SB4*pp* of semi sub spot SB4, push-pull signal SB12*pp* of sub spot SB12, push-pull signal SB34*pp* of sub spot SB34, and push-pull signal SB1234*pp*, which is the sum of the semi sub spot push-pull signals, shown in FIG. 5.

The horizontal axis in FIG. 8 shows the length of movement of the main spot MB in a direction orthogonal to the track of a DVD-RAM (refer to FIG. 5). The divisions along the horizontal axis indicate the distance the main spot has moved over the track, where at 1.23 μm, the main spot has moved over one track. In this case, each of the sub spots shown in FIG. 5 move while maintaining the relative positional relationship between them. At 0 μm, the center MBC of the main spot MB is located over the center L1C of the land track L1.

The vertical axis shows the relative amplitude value of each of the push-pull signals. The maximum amplitude value of the main spot MB is taken to be 1, and the maximum amplitude values of the push-pull signals of the semi sub spots SB1, SB2, SB3 and SB4 are taken to 0.25.

FIG. 8 shows the change in each signal waveform for push-pull signal SB1*pp* of semi sub spot SB1, push-pull signal SB2*pp* of semi sub spot SB2, push-pull signal SB3*pp* of semi sub spot SB3, push-pull signal SB4*pp* of semi sub spot SB4, push-pull signal SB1*pp*+SB2*pp*, push-pull signal SB3*pp*+SB4*pp*, and push-pull signal SB1*pp*+SB2*pp*+SB3*pp*+SB4*pp*, when the optical disc 102 moves one track (1.23 μm) in the radial direction R.

As was explained using FIG. 5, push-pull signal SB2*pp* of semi sub spot SB2 and push-pull signal SB3*pp* of semi sub spot SB3 are generated from light that is reflected from relative positions that are the same with respect to a track of a DVD-RAM, so they are in-phase signals having the same amplitude.

Moreover, push-pull signal SB1*pp* of semi sub spot SB1 and push-pull signal SB4*pp* of semi sub spot SB4 are generated from light reflected from relative positions that are the same with respect to a track of a DVD-RAM, so they are in-phase signals having the same amplitude.

Furthermore, push-pull signal SB2*pp* of semi sub spot SB2 and push-pull signal SB3*pp* of semi sub spot SB3, and push-pull signal SB1*pp* of semi sub spot SB1 and push-pull signal SB4*pp* of semi sub spot SB4 are signals having different phase (the phase differs by approximately 108 degrees).

Also, push-pull signal SB12*pp* of sub spot SB12 that results from adding push-pull signal SB1*pp* and push-pull signal SB2*pp*, and push-pull signal SB34*pp* of sub spot SB34 that results from adding push-pull signal SB3*pp* and push-pull signal SB4*pp*, become in-phase signals having the same signal amplitude value.

Therefore, push-pull signal SB1234*pp* (push-pull signal SB1*pp*+push-pull signal SB2*pp*+push-pull signal SB3*pp*+push-pull signal SB4*pp*) that results from adding push-pull signal SB12*pp* (push-pull signal SB1*pp*+push-pull signal SB2*pp*) and push-pull signal SB34*pp* (push-pull signal SB3*pp*+push-pull signal SB4*pp*) has a signal amplitude value that is approximately 2.3 times the signal amplitude value of a push-pull signal (SB1*pp*, SB2*pp*, SB3*pp* or SB4*pp*) of a semi sub spot.

In addition, the push-pull signal SB1234*pp* is in a reverse phase relationship with the push-pull signal MBpp of the main spot MB, so DPPTRE has an amplitude that is approximately 1.6 times larger when compared with only the main spot MB. Also, by using DPPTRE, it is possible to efficiently correct change in reflected light that may occur due to distribution shifting of the reflected light when the object lens is offset, or when the optical disc is tilted.

(II-2) Embodiment of an Optical Disc Such as a DVD-R

Figure 7:
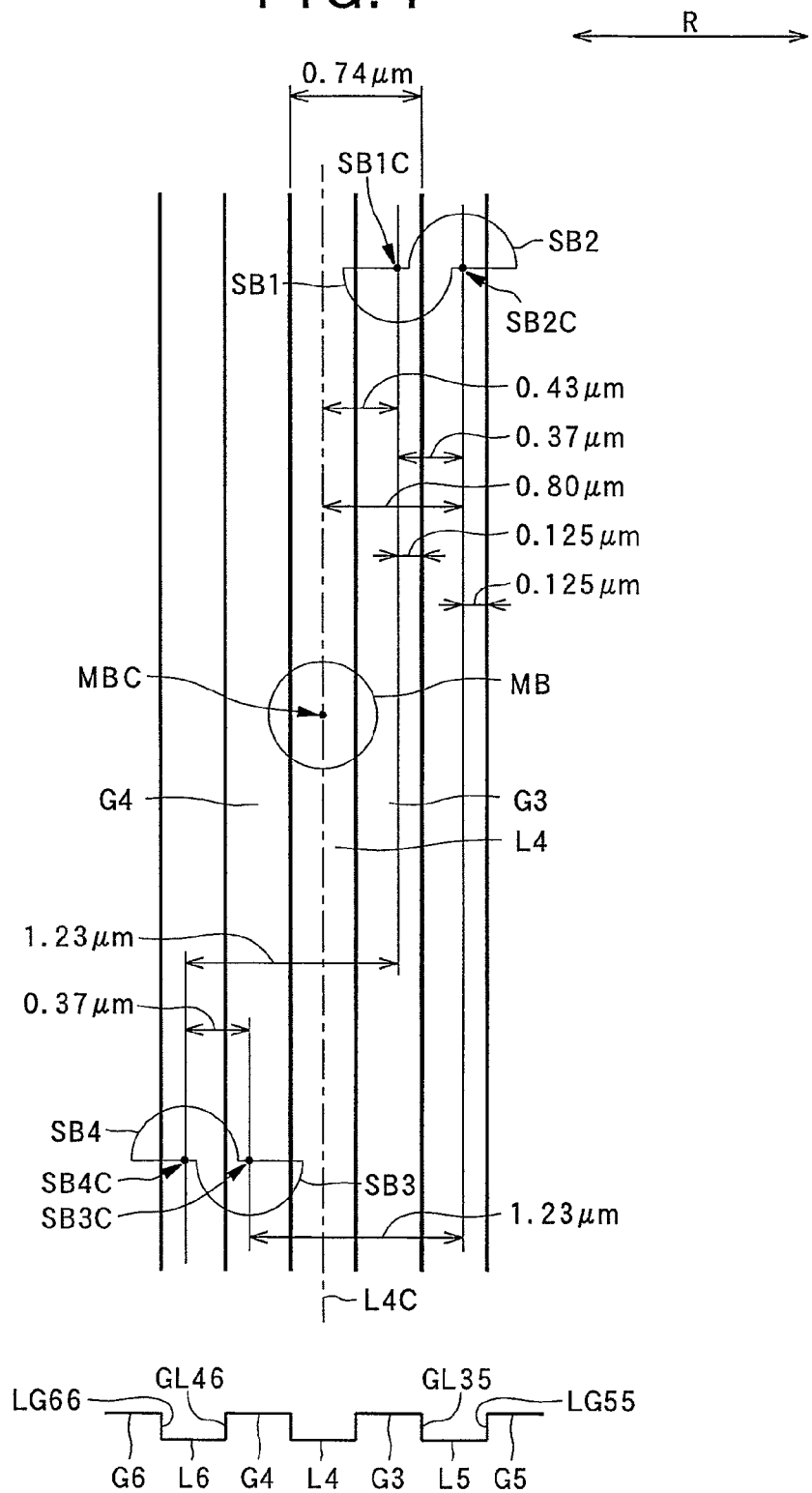
FIG. 7 is a drawing showing the shapes and positional relationship of a main spot, sub spots and semi sub spots on a track of an optical disc such as a DVD-R of a first embodiment of the invention.

FIG. 7 is a drawing showing the shapes and positional relationship of the main spot MB and semi sub spots SB1, SB2, SB3 and SB4 that make up sub spots for the case in when this embodiment of the invention is applied to an optical disc such as a DVD-R having a track pitch of 0.74 μm.

FIG. 7 shows the case when the center MBC of the main spot MB is located on the centerline L4C in the radial direction R of the land track L4 (width 0.37 μm).

Moreover, the position of the center point SB1C of the semi circular semi sub spot SB1 is formed at a position that is separated 0.43 μm in the radial direction R from the centerline L4C of land track L4.

Furthermore, the position of the center point SB2C of the semi circular semi sub spot SB2 is formed at a position that is separated 0.80 μm in the radial direction R from the centerline L4C of land track L4.

Therefore, the distance in the radial direction R between the position of the center point SB1C of semi circular semi sub spot SB1 and the position of the center point SB2C of semi circular semi sub spot SB2 is 0.37 μm. The distance 0.37 μm is half the track pitch of 0.74 μm of a DVD disc such as a DVD-R, DVD-RW and DVD+RW.

In other words, the distance between the position of the center point SB1C of semi circular semi sub spot SB1 and the position of the center point SB2C of semi circular semi sub spot SB2 is a distance that corresponds to half the track pitch of an optical disc such as a DVD-R.

Therefore, when the center point SB1C of semi circular semi sub spot SB1 is located on a groove track G3 of an optical disc such as a DVD-R, the center point SB2C of semi circular semi sub spot SB2 is located on land track L5 of the optical disc such as a DVD-R.

In this case, the center point SB1C of semi circular semi sub spot SB1 is formed at a position that is separated 0.125 μm on the main spot side from the boundary position GL35 between the land track L5 and groove track G3. Similarly, the center point SB2C of semi circular semi sub spot SB2 is formed at a position that is separated 0.125 μm on the main spot side from the boundary position GL55 between the land track L5 and groove track G5.

In other words, the center positions of each of the semi sub spots are located at positions separated the same distance in the radial direction R from the boundary positions between land tracks and groove tracks. Therefore, the light reflected from the optical recording medium at semi sub spot SB1 and semi sub spot SB2 becomes signals having reverse phase.

In this case, the push-pull signal from the light reflected from the optical recording medium at semi sub spot SB1 and the push-pull signal from the light reflected from the optical recording medium at semi sub spot SB2 also are signals having reverse phase.

Moreover, since the push-pull signal from the light reflected from the optical recording medium at semi sub spot SB1 and the push-pull signal from the light reflected from the optical recording medium at semi sub spot SB2 are signals having reverse phase, adding both push-pull signals together results in zero.

In addition, semi sub spot SB3 and semi sub spot SB4 are formed on the opposite side in the radial direction R of land track L4.

The position of the center point SB3C of the semi circular semi sub spot SB3 is formed at a position that is separated 0.43 μm in the opposite radial direction R from the centerline L4C of the land track L4 than semi sub spot SB1.

Also, the position of the center point SB4C of the semi circular semi sub spot SB4 is formed at a position that is separated 0.80 μm in the opposite radial direction R from the centerline L4C of the land track L4 than semi sub spot SB2.

The distance between the position of the center point SB3C of semi circular semi sub spot SB3 and the position of the center point SB4C of semi circular semi sub spot SB4 is 0.37 μm.

In other words, the distance between the position of the center point SB3C of semi circular semi sub spot SB3 and the position of the center point SB4C of semi circular semi sub spot SB4 is a distance that corresponds to half the track pitch of an optical disc such as a DVD-R.

Therefore, when the center point SB3C of the semi circular semis sub spot SB3 is located on the groove track G4 of an optical disc such as a DVD-R, the center point SB4C of semi circular semi sub spot SB4 is located on the land track L6 of the optical disc such as a DVD-R.

In this case, the center point SB3C of the semi circular semi sub spot SB3 is formed at a position that is separated 0.125 μm on the main spot side from the boundary position GL46 between land track L6 and groove track G4. Similarly, the center point SB4C of the semi circular semi sub spot SB4 is formed at a position that is separated 0.125 μm on the main spot side from the boundary position LG66 between land track L6 and groove track G6.

In other words, the center positions of each semi sub spot are located at positions that are shifted in the radial direction the same distance from the boundary positions between land tracks and groove tracks. Therefore, the light reflected from the optical recording medium at semi sub spot SB3 and semi sub spot SB4 becomes signals having reverse phase.

In this case, the push-pull signal from the light reflected from the optical recording medium at semi sub spot SB3, and the push-pull signal from the light reflected from the optical recording medium at semi sub spot SB4 are signals having reverse phase.

Moreover, since the push-pull signal from the light reflected from the optical recording medium at semi sub spot SB3, and the push-pull signal from the light reflected from the optical recording medium at semi sub spot SB4 are signals having reverse phase, the result of adding both push-pull signals together is zero.

Furthermore, the sum of all of push-pull signals from all of the semi sub spots (SB1, SB2, SB3 and SB4) is also zero.

[Change in Push-Pull Signals from the Semi Sub Spots]

Figure 9:
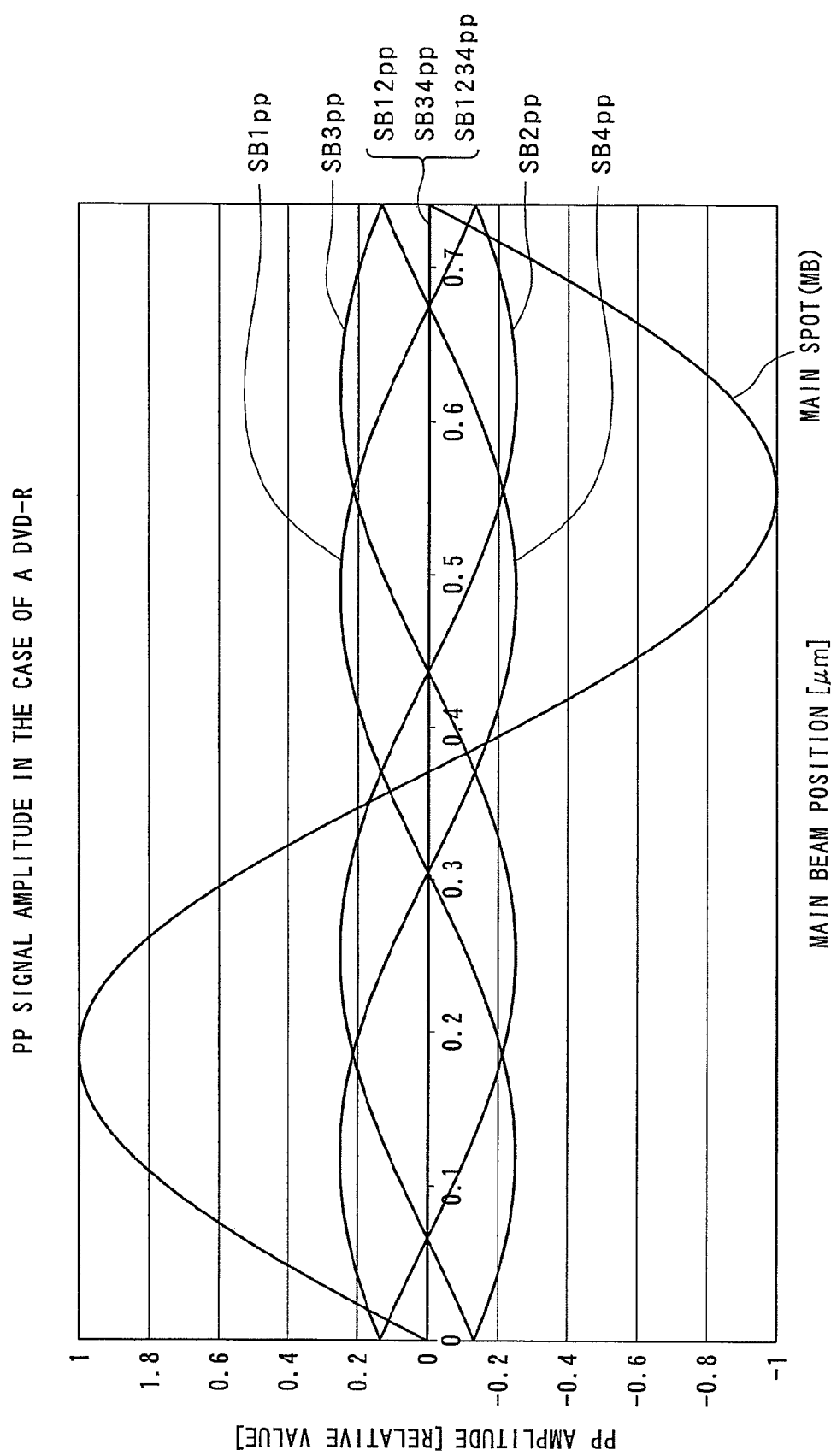
FIG. 9 is a drawing that shows the change in semi spot push-pull signals of an optical disc such as a DVD-R of a first embodiment of the invention.

Next, FIG. 9 explains the change in the push-pull signals from semi sub spots SB1, SB2, SB3 and SB4, the push-pull signals from sub spot SB12 and sub spot SB34, and the sum of the push-pull signals from the semi sub spots, shown in FIG. 7.

The horizontal axis in FIG. 9 is the distance that the main spot MB moves in a direction that is orthogonal to the track (radial direction) on an optical disc such as a DVD-R having a track pitch of 0.74 μm. The divisions along the horizontal axis indicate the distance that the main spot MB moves on the track. In this case, each of the sub spots shown in FIG. 7 move while maintaining the relative positional relationship between them. At 0 μm, the center MBC of the main spot MB is located on the center L4C of land track L4.

The vertical axis shows the relative amplitude value of each of the push-pull signals. With the maximum amplitude value of the main spot MB taken to be 1, the maximum amplitude values of the push-pull signals of the semi sub spots SB1, SB2, SB3 and SB4 are taken to be 0.25.

FIG. 9 shows the change in each signal waveform for push-pull signal SB1$pp$ of semi sub spot SB1, push-pull signal SB2$pp$ of semi sub spot SB2, push-pull signal SB3$pp$ of semi sub spot SB3, push-pull signal SB4$pp$ of semi sub spot SB4, push-pull signal SB1$pp$+SB2$pp$, push-pull signal SB3$pp$+SB4$pp$, and push-pull signal SB1$pp$+SB2$pp$+SB3$pp$+SB4$pp$, when the optical disc 102 moves one track (0.74 μm) in the radial direction R.

As explained in FIG. 7, the distance in the radial direction R between the position of the center point SB1C of the semi circular semi sub spot SB1 and the position of the center point SB2C of the semi circular semi sub spot SB2 is 0.37 μm, which corresponds to half the track pitch. Therefore, the light reflected at semi sub spot SB1 and the light reflected at semi circular semi sub spot SB2 is in a reverse phase relationship.

Therefore, the push-pull signal SB1$pp$ of semi sub spot SB1 and the push-pull signal SB2$pp$ of semi sub spot SB2 are in a reverse phase relationship. Accordingly, in FIG. 9, push-pull signal SB1$pp$ and push-pull signal SB2$pp$ are out of phase by 180 degrees.

Moreover, the distance in the radial direction R between the position of the center point SB3C of the semi circular semi sub spot SB3 and the position of the center point SB4C of the semi circular semi sub spot SB4 is 0.37 μm, which corresponds to half the track pitch. Therefore, the light reflected at semi sub spot SB3 and the light reflected at semi circular semi sub spot SB4 is in a reverse phase relationship.

Therefore, the push-pull signal SB3$pp$ of semi sub spot SB3 and the push-pull signal SB4$pp$ of semi sub spot SB4 are in a reverse phase relationship. Accordingly, in FIG. 9, push-pull signal SB3$pp$ and push-pull signal SB4$pp$ are out of phase by 180 degrees.

Moreover, the signal SB12$pp$, which is the result of adding together push-pull signal SB1$pp$ and push-pull signal SB2$pp$ that are in a reverse phase relationship, is zero.

Furthermore, the signal SB34*pp*, which is the result of adding together push-pull signal SB3*pp* and push-pull signal SB4*pp* that are in a reverse phase relationship, is zero.

Therefore, the total of the push-pull signals of all of the semi sub spots SB1234*pp* becomes zero.

Here, the tracking error signal DPPTRE of a DVD-R is expressed by Equation 1 as described above.

Therefore, the tracking error signal DPPTRE can be expressed as (MBpp−k(SB1*pp*+SB2*pp*+SB3*pp*+SB4*pp*)). (Here, k is a constant.)

In the case of a DVD-R, SB1*pp*+SB2*pp*+SB3*pp*+SB4*pp* becomes zero, so the tracking error signal DPTTRE can be expressed as the push-pull signal MBpp of the reflected light from the main spot MB.

However, when an optical offset occurs due to the object lens or the like, or when the optical disc is tilted, the sum of the push-pull signals of the sub spots, which is SB1*pp*+SB2*pp*+SB3*pp*+SB4*pp*, does not become zero due to uneven distribution, so an erroneous signal is generated.

Similarly, in the push-pull signal MBpp of the reflected light from the main spot as well, when an optical offset occurs due to the object lens or the like, or when the optical disc is tilted, an erroneous signal is generated due to uneven distribution of reflected light.

However, since the difference is taken between push-pull signal MBpp and the sum of the sub spot push-pull signals, SB1*pp*+SB2*pp*+SB3*pp*+SB4*pp*, it is possible to eliminate uneven distribution of reflected light when there is optical offset by the object lens or the like, or when the optical disc is tilted.

(III) Second Embodiment of the Invention

Figure 10:
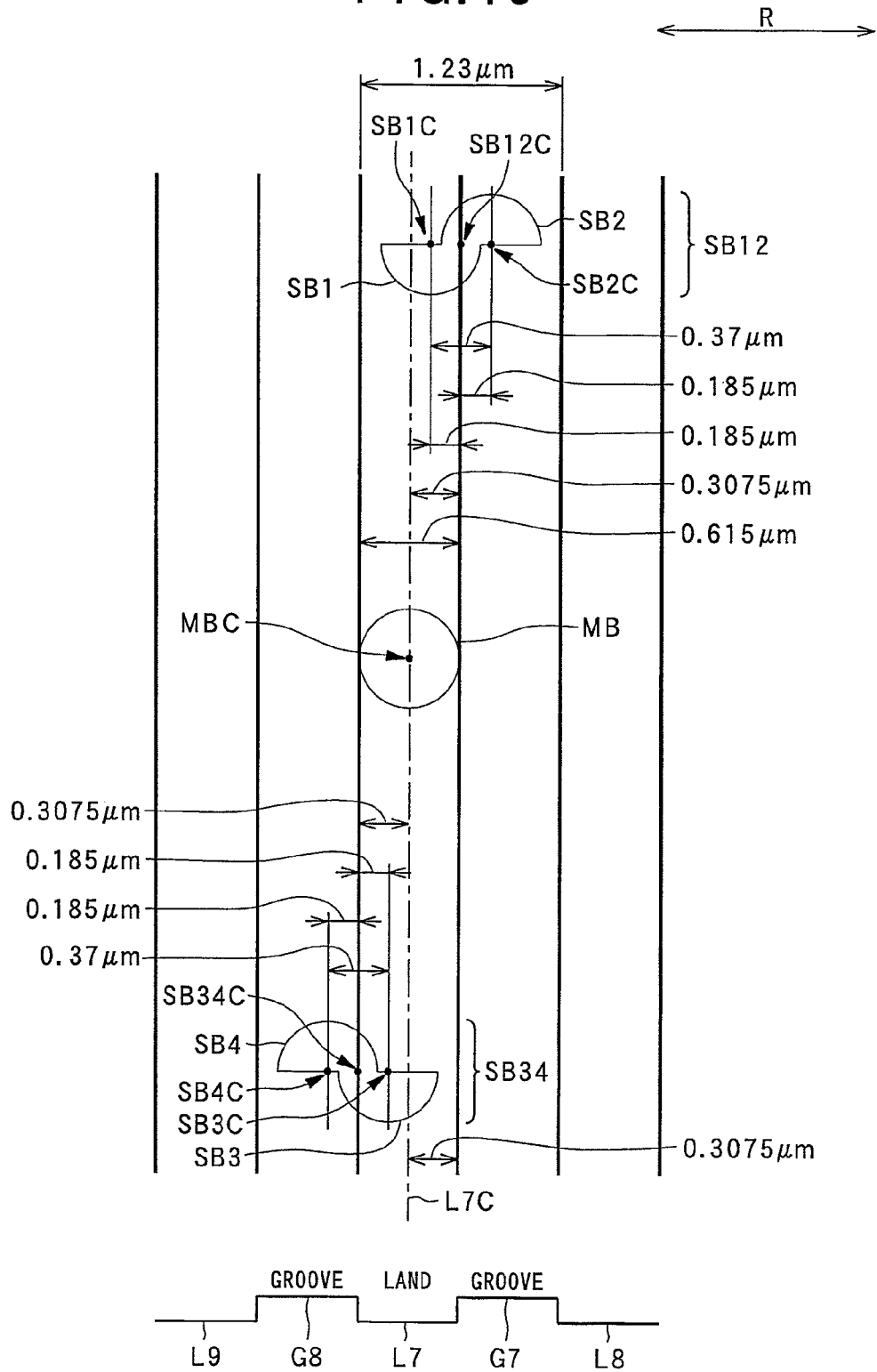
FIG. 10 is a drawing showing the shapes and positional relationship of a main spot, sub spots and semi sub spots on a track of an optical disc such as a DVD-RAM of a second embodiment of the invention.
Figure 11:
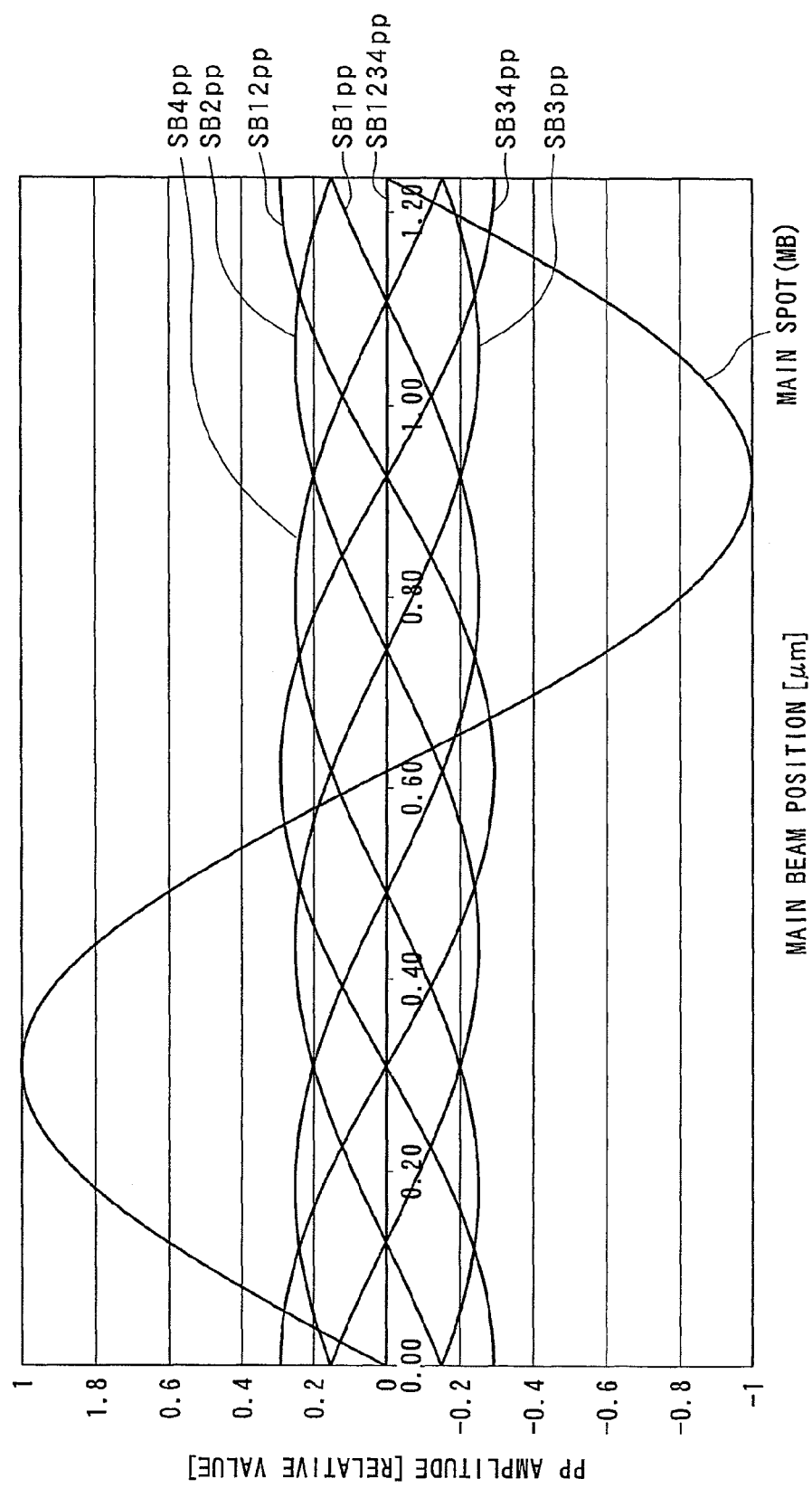
FIG. 11 is a drawing that shows the change in semi spot push-pull signals of a DVD-RAM of a second embodiment of the invention.

Next, FIG. 10 and FIG. 11 will be used to explain a second embodiment of the present invention. In this embodiment, an optical pickup device is explained that, according to settings at the time of shipment, is capable of both recording information on and reproducing information from an optical disc such as a DVD-R having a track pitch of 0.74 μm, and an optical disc such as a DVD-RAM having a track pitch of 1.23 μm.

This embodiment differs from the first embodiment in that the distance between the main spot and sub spots differs. In this embodiment, the distance between the main spot and sub spots is 0.3075 μm, which is one fourth the track pitch of an optical disc such as a DVD-RAM.

The positional relationships of the main spot, sub spots and semi sub spots, which are formed on the optical disc 102, and each of the light receiving sections 16 are the same as the positional relationships described in FIG. 5.

Next, the positional relationships between the main spot, sub spots and semi sub spots that are formed on the optical disc will be explained.

In this embodiment, the semi sub spots are taken to be semi circular in shape, however, it is possible use any arbitrary shape.

(III-1) Embodiment in the Case of a DVD-RAM

FIG. 10 is a drawing showing the shapes and positional relationships of the main spot MB, semi sub spot SB1 and semi sub spot SB2 that make up sub spot SB12, and semi sub spot SB3 and semi sub spot SB4 that make up sub spot SB34, for the case in which the embodiment is applied to a DVD-RAM (an optical disc having a track pitch of 1.23 μm).

FIG. 10 shows the case in which the center MBC of the main spot MB is located on the centerline L7C in the radial direction R of the land track L7 (width 0.615 μm).

Moreover, the position of the center point SB2C of the semi circular semi sub spot SB2 is formed at a position that is separated 0.185 μm from the boundary line between the land track L7 and the groove track G7 on the opposite side in the radial direction R than the main spot MB.

Also, the center point SB1C of the semi circular semi sub spot SB1 is formed at a position that is separated 0.185 μm from the boundary line between the land track L7 and the groove track G7 in the radial direction R toward the main spot MB.

Therefore, the distance in the radial direction R between the center position of the center point SB1C of the semi circular semi sub spot SB1 and the position of the center point SB2C of the semi circular semi sub spot SB2 is 0.37 μm (0.185 μm×2). The distance 0.37 μm is half the track pitch 0.74 μm of a DVD disc such as a DVD-R, DVD-RW or DVD+RW.

In other words, the distance between the center position of the center point SB1C of the semi circular semi sub spot SB1 and the position of the center point SB2C of the semi circular semi sub spot SB2 is a distance that corresponds to half the track pitch of an optical disc such as a DVD-R.

In addition, the center position of the center point SB1C of the semi circular semi sub spot SB1 and the position of the center point SB2C of the semi circular semi sub spot SB2 are formed at symmetric positions on both sides of the boundary between the land track L7 and groove track G7.

Furthermore, the center position SB12C of the sub spot that is made up of the semi circular semi sub spot SB1 and the semi circular semi sub spot SB2 is formed at a position separated 0.3075 μm in the radial direction R from the centerline L1C of the land track L1. The distance 0.3075 μm is one fourth the value of the track pitch 1.23 μm of a DVD-RAM.

Therefore, the center position SB12C of the sub spot SB12 is located on the boundary line between the land track L7 and the groove track G7.

Also, the intensities of the reflected light that is reflected from the optical recording medium at semi sub spot SB1 and semi sub spot SB2 have the same maximum intensity, however become signals having different phase (the phase differs by approximately 108 degrees). Moreover, the intensities of the push-pull signal of semi sub spot SB1 and the push-pull signal of semi sub spot SB2 have the same reflected light intensity from the optical recording medium, however are signals having different phase (the phase differs by approximately 108 degrees).

Next, the positional relationship of the semi circular semi sub spot SB3 and the semi circular semi sub spot SB4 will be explained.

The position of the center point SB4C of the semi circular semi sub spot SB4 is formed at a position that is separated 0.185 μm from the boundary line between the land track L7 and the groove track G8 on the opposite side in the radial direction than the main spot MB.

Moreover, the position of the center point SB3C of the semi circular semi sub spot SB3 is formed at a position separated 0.185 μm from the boundary line between the land track L7 and the groove track G8 in the radial direction R toward the main spot MB.

Therefore, the distance in the radial direction R between the position of the center point SB4C of the semi circular semi sub spot SB4 and the position of the center point SB3C of the semi circular semi sub spot SB3 is 0.37 μm (0.185 μm×2). The distance 0.37 μm is half the track pitch 0.74 μm of a DVD disc such as a DVD-R, DVD-RW or DVD+RW.

In other words, the distance between the position of the center point SB4C of the semi circular semi sub spot SB4 and the position of the center point SB3C of the semi circular semi sub spot SB3 is a distance that corresponds to half the track pitch of an optical disc such as a DVD-R.

Moreover, the center point SB4C of the semi circular semi sub spot SB4 and the center point SB3C of the semi circular semi sub spot SB3 are formed at symmetric positions on both sides of the boundary line between the land track L7 and the groove track G8.

Furthermore, the center position SB34C of the sub spot SB34 that is made up from the semi circular semi sub spot SB3 and the semi circular semi sub spot SB4 is formed at a position that is separated 0.3075 μm in the radial direction R from the centerline L7C of the land track L7. The distance 0.3075 μm is one fourth the value of the track pitch 1.23 μm of a DVD-RAM.

Therefore, the center position SB34C of the sub spot SB34 is located on the boundary line between the land track L7 and the groove track G8.

Moreover, the intensities of the reflected light that is reflected from the optical recording medium at semi sub spot SB3 and semi sub spot SB4 have the same maximum intensity, however become signals having difference phase (the phase differs by approximately 108 degrees). Also, the intensities of the push-pull signal of semi sub spot SB3 and the push-pull signal of semi sub spot SB4 have the same maximum reflected light intensity from the optical recording medium, however are signals having different phase (the phase differs by approximately 108 degrees).

Furthermore, since the distance between the center position SB12C of the sub spot SB12 and the center position SB34C of the sub spot SB34 with the center position MBC of the main spot MB in the center is half (0.615 μm) the track pitch of a DVD-RAM, SB12pp and SB343pp are in a reverse phase relationship.

Therefore, the total of the push-pull signals of the semi sub spots (SB1pp+SB2pp+SB3pp+SB4pp) becomes zero.

In this embodiment, as a rule, the tracking error signal DPTRE of Equation 1 is expressed by the push-pull signal MBpp of the main spot.

However, when optical offset of the object lens or the like occurs, or when the optical disc is tilted, the sum of the push-pull signals of the semi sub spots SB1pp+SB2pp+SB3pp+SB4pp will not become zero due to an uneven distribution of reflected light, and a erroneous signal is generated.

Therefore, by calculating the difference between that sum and the push-pull signal MBpp of the main spot, the effects of this uneven distribution of reflected light are reduced.

[Change in the Push-Pull Signals of the Semi Sub Spots]

Next, in FIG. 11, the change in the push-pull signal SB1pp of semi sub spot SB1, the push-pull signal SB2pp of semi sub spot SB2, the push-pull signal SB3pp of semi sub spot SB3 and the push-pull signal SB4pp of semi sub spot SB4, the push-pull signal SB12pp of sub spot SB12 and the push-pull signal SB34pp of sub spot SB34, and the push-pull signal SB1234pp of the sum of the push-pull signals of the semi sub spots shown in FIG. 10 is explained.

The horizontal axis of FIG. 11 is the distance that the main spot MB moves in a direction that is orthogonal to the track (radial direction) of an optical disc, such as a DVD-RAM, having a track pitch of 1.23 μm. The divisions of the horizontal axis indicate the distance that the main spot MB moves over the track, and at 1.23 μm, the main spot MB has moved one track. In this case, each of the sub spots shown in FIG. 10 move while maintaining the relative positional relationship between them. At 0 μm, the center MBC of the main spot is located on the centerline L7C of the land track L7.

The vertical axis shows the relative amplitude value of each push-pull signal. The maximum amplitude value of the main spot MB is taken to be 1, and the maximum amplitude value of the push-pull signals of the semi sub spots SB1, SB2, SB3 and SB4 is taken to 0.25.

The push-pull signal SB1pp of semi sub spot SB1, the push-pull signal SB2pp of semi sub spot SB2, the push-pull signal SB3pp of semi sub spot SB3 and the push-pull signal SB4pp of semi sub spot SB4 show the change in the signal over 1 cycle in which the phase of each is different.

The push-pull signal SB12pp of sub spot SB12, and the push-pull signal SB34pp of sub spot SB34 are signals having opposite phase.

Therefore, the push-pull signal SB1234, which is the sum of the push-pull signals of each of the semi sub spots, becomes zero.

(III-2) Embodiment in the Case of an Optical Disc Such as a DVD-R

Figure 12:
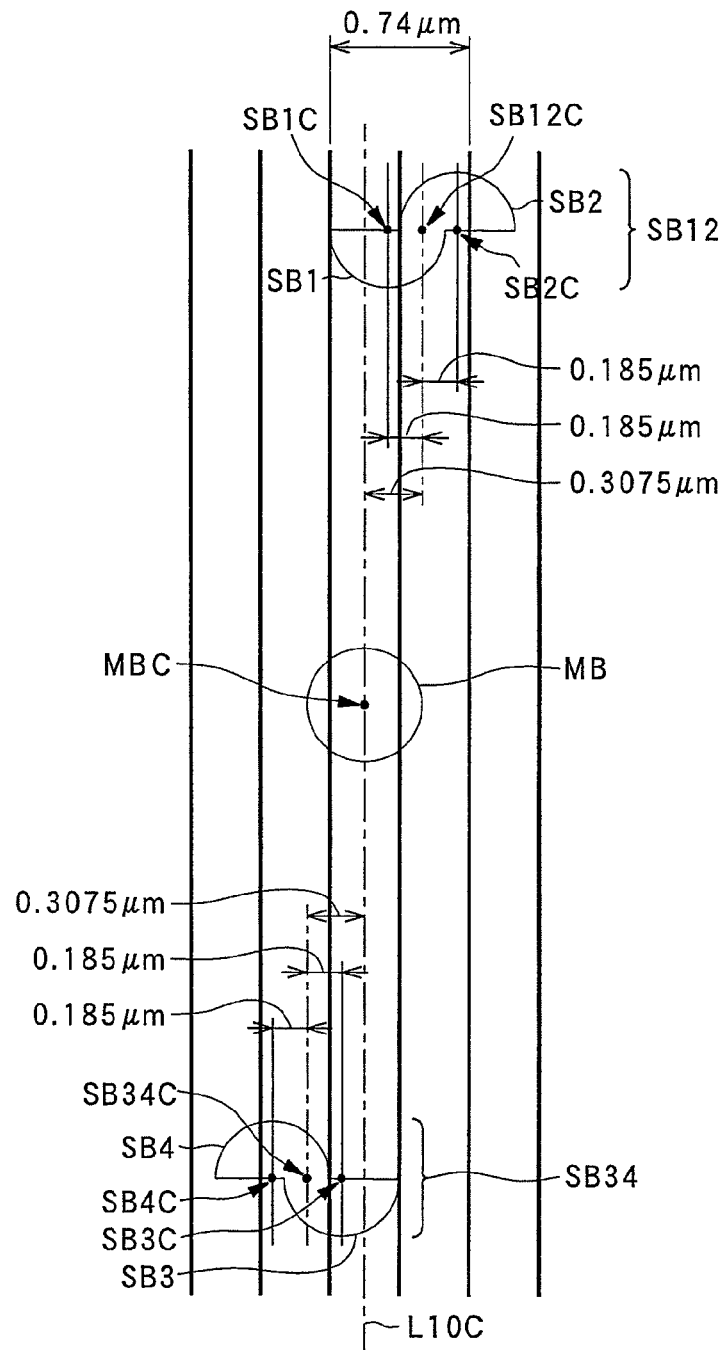
FIG. 12 is a drawing showing the shapes and positional relationship of a main spot, sub spots and semi sub spots on a track of an optical disc such as a DVD-R of a second embodiment of the invention.

FIG. 12 is a drawing that shows the shapes and positional relationship of the main spot MB, sub spot SB12, sub spot SB34, semi sub spot SB1 and semi sub spot SB2 that make up sub spot SB12, and semi sub spot SB3 and semi sub spot SB4 that make up sub spot SB34 for the case in which this embodiment is applied to an optical disc such as a DVD-R (optical disc having a track pitch of 0.74 μm).

FIG. 12 shows the case in which the center MBC of the main spot MB is located on the centerline L10C in the radial direction R of the land track L10 (width 0.37 μm).

Moreover, the position of the center point SB2C of the semi circular semi sub spot SB2 is formed at a position that is separated 0.185 μm from the center position SB12C of the sub spot SB12 on the opposite side in the radial direction R than the main spot MB.

Furthermore, the position of the center point SB1C of the semi circular semi sub spot SB1 is formed at a position that is separated 0.185 μm from the center position SB12C of the sub spot SB12 in the radial direction toward the main spot MB.

Therefore, the distance in the radial direction R between the position of the center point SB1C of the semi circular semi sub spot SB1 and the position of the center point SB2C of the semi circular semi sub spot SB2 is 0.37 μm (0.185 μm×2). The distance 0.37 μm is half the track pitch 0.74 μm of a DVD disc such as a DVD-R, DVD-RW or DVD+RW.

Moreover, the center point SB1C of the semi circular semi sub spot SB1 and the position of the center point SB2C of the semi circular semi sub spot SB2 are formed at target positions on both sides of the center position SB12C of sub spot SB12.

Furthermore, the center position SB12C of sub spot SB12 that is made up from semi circular semi sub spot SB1 and semi circular semi sub spot SB2 is formed at a position that is separated 0.3075 μm in the radial direction R from the centerline L10C of the land track L10. The distance 0.3075 μm is one fourth the track pitch 1.23 μm of a DVD-RAM.

In addition, the intensities of the reflected light that is reflected from the optical recording medium at semi sub spot SB1 and semi sub spot SB2 have the same maximum value, however become signals having different phase. Also the push-pull signal SB1pp of semi sub spot SB1, and the push-pull signal SB2pp of semi sub spot SB2 have the same maximum reflected light intensity from the optical recording medium, however are signals having the opposite phase (the phase differs by 180 degrees).

Therefore, the signal SB12*pp*, which is the sum of the push-pull signal SB1*pp* of the semi sub spot SB1 and the push-pull signal SB2*pp* of the semi sub spot SB2, becomes zero.

Moreover, the position of the center point SB4C of the semi circular semi sub spot SB4 is formed at a position that is separated 0.185 μm from the center position SB34C of sub spot SB34 on the opposite side in the radial direction R than the main spot MB.

Furthermore, the position of the center point SB3 of the semi circular semi sub spot SB3 is formed at a position that is separated 0.185 μm from the center position SB34 of sub spot SB34 in the radial direction R toward the main spot MB.

Therefore, the distance in the radial direction R between the position of the center point SB4C of semi circular semi sub spot SB4 and the position of the center point SB3C of the semi circular semi sub spot SB3 is 0.37 μm (0.185 μm×2). The distance 0.37 μm is half the track pitch 0.74 μm of a DVD disc such as a DVD-R, DVD-RW or DVD+RW.

Moreover, the center point SB4C of the semi circular semi sub spot SB4 and the center point SB3C of the semi circular semi sub spot SB3 are formed at symmetric positions on both sides of the center position SB34C of sub spot SB34.

Furthermore, the center position SB34C of sub spot SB34 that is made up from semi circular semi sub spot SB3 and semi circular semi sub spot SB4 is formed at a position that is separated 0.3075 μm in the radial direction R from the centerline L10C of the land track L10. The distance 0.3075 μm is one fourth the track pitch 1.23 μm of a DVD-RAM.

In addition, the intensities of the reflected light that is reflected from the optical recording medium at semi sub spot SB3 and semi sub spot SB4 have the same maximum value, however become signals having different phase. Also the push-pull signal SB3*pp* of semi sub spot SB3, and the push-pull signal SB4*pp* of semi sub spot SB4 have the same maximum reflected light intensity from the optical recording medium, however are signals having the opposite phase (the phase differs by 180 degrees).

Therefore, the signal SB34*pp*, which is the sum of the push-pull signal SB3*pp* of the semi sub spot SB3 and the push-pull signal SB4*pp* of the semi sub spot SB4, becomes zero.

Also, the push-pull signal SB1234*pp*, which is the sum of the push-pull signals of the semi sub spots, becomes zero.

Moreover, the total of the push-pull signals of the semi sub spots (SB1*pp*+SB2*pp*+SB3*pp*+SB4*pp*) becomes zero.

In this embodiment, as a rule, the tracking error DPTRE of Equation 1 is expressed by the push-pull signal MBpp of the main spot MB.

However, when optical offset of the object lens or the like occurs, or when the optical disc is tilted, the sum of the push-pull signals of the semi sub spots SB1*pp*+SB2*pp*+SB3*pp*+SB4*pp* will not become zero due to an uneven distribution of reflected light, and a erroneous signal is generated.

Therefore, by calculating the difference between that sum and the push-pull signal MBpp of the main spot, the effects of this uneven distribution of reflected light are reduced.

[Change in the Push-Pull Signals of the Semi Sub Spots]

Figure 13:
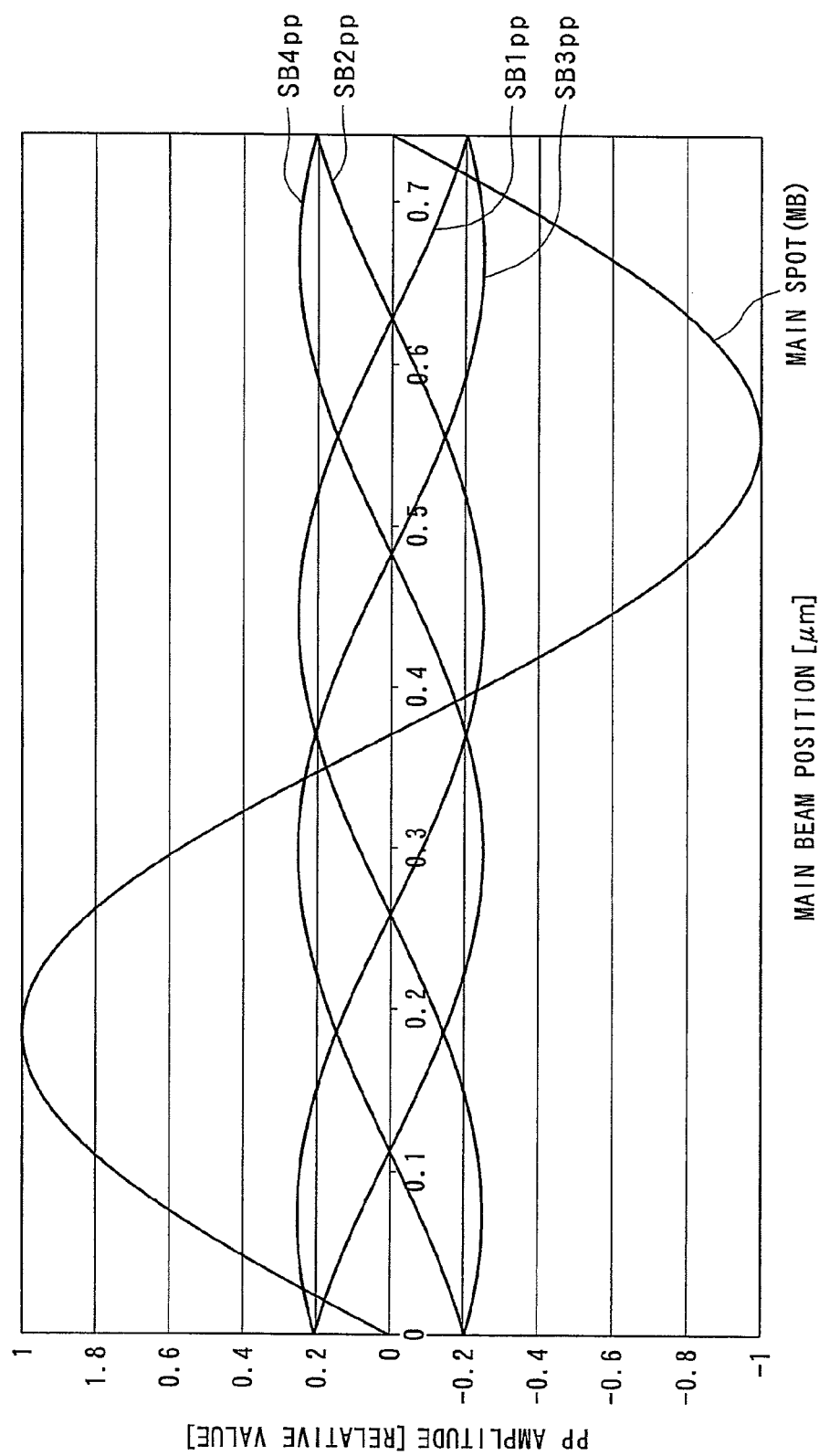
FIG. 13 is a drawing that shows the change in semi spot push-pull signals on an optical disc such as a DVD-R of a second embodiment of the invention.

Next, in FIG. 13, the change in the push-pull signal SB1*pp* of semi sub spot SB1, the push-pull signal SB2*pp* of semi sub spot SB2, the push-pull signal SB3*pp* of semi sub spot SB3 and the push-pull signal SB4*pp* of semi sub spot SB4, the push-pull signal SB12*pp* of sub spot SB12 and the push-pull signal SB34*pp* of sub spot SB34, and the push-pull signal SB1234*pp* of the sum of the push-pull signals of the semi sub spots shown in FIG. 12 is explained.

The horizontal axis of FIG. 13 is the distance that the main spot MB moves in a direction that is orthogonal to the track (radial direction) of an optical disc, such as a DVD-R, having a track pitch of 0.74 μm. The divisions of the horizontal axis indicate the distance that the main spot MB moves over the track, and at 0.74 μm, the main spot MB has moved one track. In this case, each of the sub spots shown in FIG. 11 move while maintaining the relative positional relationship between them. At 0 μm, the center MBC of the main spot is located on the centerline L10C of the land track L10.

The vertical axis shows the relative amplitude value of each push-pull signal. The maximum amplitude value of the main spot MB is taken to be 1, and the maximum amplitude value of the push-pull signals of the semi sub spots SB1, SB2, SB3 and SB4 is taken to be 0.25.

The maximum value of the push-pull signals of each of the semi sub spots is the same, however, the signals have different phases.

Push-pull signal SB1*pp* and push-pull signal SB2*pp* are in a reverse phase relationship. Also, push-pull signal SB1*pp* and push-pull signal SB2*pp* are in a reverse phase relationship.

Therefore, the values of push-pull signal SB12*pp*, push-pull signal SB34*pp* and push-pull signal SB1234*pp* become zero.

As was described above, with each of the embodiments of the present invention, it is possible to provide an optical pickup device and optical medium information recording/reproduction device that are capable of commonly using optical discs having different sized track pitches, such as a DVD-RAM having a track pitch of 0.74 μm, and a DVD-R having a track pitch of 1.23 μm.

When the interval between a pair of semi sub spots on an optical disc is taken to be half the track pitch of an optical disc, by rotating and adjusting the diffraction grating so that the level of the push-pull signals of reflected light from the semi sub spots becomes a maximum for optical discs having other track pitches, it is possible to generate a suitable differential push-pull signal as a tracking error signal for optical discs having different track pitches. As a result, it becomes possible to perform accurate tracking servo control of optical discs having different track pitches.

By performing tracking servo that, of the light distribution of reflected light (diffracted light) that is reflected from the optical disc, uses the difference in the quantity of light of areas on both sides where the tracking error offset due to movement of the object lens becomes a minimum, this optical pickup device is able to detect an accurate tracking signal for optical discs having different track pitches.

Moreover, by having the differential push-pull signal of the main beam have the opposite phase as the differential push-pull signal of the sub beams, it is possible to accurately generate a tracking error signal according to the differential push-pull signals for discs having different track pitches.

Furthermore, the reduction in track cross noise of a double astigmatism becomes 0.21.

Also, by making the sub spots corresponding to the sub beams be semi sub spots that correspond to a pair of semi sub beams that are shifted in directions orthogonal to the track of the optical disc, it is possible to reduce effects due to the phase shift of the sub spots of the differential push-pull signals.

In addition, by making the distance between the semi sub spots in the direction orthogonal to the track with respect to the main spot the same value as the track pitch of the optical disc, it is possible to generate a push-pull signal for that optical disc between corresponding semi sub spots.

Also, since push-pull signals can be generated for each semi sub spot, it is possible to generate push-pull signals for the sub spots by appropriate combination of signals.

As a result, it is possible to generate a suitable differential push-pull signal as a tracking error signal for optical discs having different track pitches.

Moreover, the sum of the push-pull signals of each of the semi sub spots become a periodic signal that corresponds to the track pitch of the DVD-RAM, so it is possible to generate a suitable tracking error signal for tracking error servo control that uses a differential push-pull signal.

Furthermore, by using an optical pickup device that generates a suitable differential push-pull signal as a tracking error signal for optical discs having different track pitches, it is possible to provide an optical disc reproduction device that is capable of accurately reading information that is recorded on optical discs having different track pitches.

The invention claimed is:

1. An optical pickup device comprising:
   a light emission device for emitting at least one or more light beam;
   a light focusing device for focusing a light beam that is emitted from the light emission device onto an optical recording medium;
   a light diffraction device that is located between the light emission device and light focusing device, and that forms the light that is emitted from the light emission device into a main light beam, and at least two or more sub light beams at positions on the optical recording medium on which the main light beam is irradiated that are symmetrical with respect to the main light beam in a direction orthogonal to the direction of a track on which information is recorded;
   a main light beam receiving device for receiving light of the main beam that is reflected from the optical recording medium; and
   a sub light beam receiving device for receiving light of the sub light beams that is reflected from the optical recording medium; wherein
   each of the sub light beam is made up of a pair of semi sub beams such that the distance between the centers of a pair of semi sub spots that are formed on the optical recording medium and that correspond to the pair of semi sub beams that are irradiated on the optical recording device is an odd multiple of the length of approximately half the track pitch length of a first optical recording medium, and the distance in the radial direction of the optical recording medium between the center of a main spot that is formed on the optical recording medium and that corresponds to the main beam and the center of a sub spot made up from the pair of semi sub spots is an odd multiple of the length of approximately half the track pitch length of a second optical recording medium.

2. The optical pickup device of claim 1, wherein
   the distance in the radial direction of the optical recording medium between the center of a main spot that is formed on the optical recording medium and that corresponds to the main beam and the center of a sub spot that is made up from the pair of semi sub spots is an odd multiple of the length that is approximately one fourth the track pitch length of a second optical recording medium.

3. The optical pickup device of claim 1, wherein
   the pair of semi sub spots are symmetric in the direction orthogonal to a track formed on the optical recording medium.

4. The optical pickup device of claim 1, wherein
   the distance in the radial direction of the optical recording medium between the center of the main spot and center of the semi sub spots that are formed at positions that are separated from the main spot in a direction orthogonal to the track at the sub spot is an odd multiple of a length that is approximately half the track pitch of a third optical recording medium.

5. The optical pickup device of claim 1, wherein
   the sub light beam receiving device comprises:
   four semi sub light receiving surfaces that are divided in the direction of the track of the optical recording medium and direction orthogonal to the track direction such that each the semi sub light receiving surface receives light that is reflected from the semi sub spots;
   a semi sub light receiving surface conversion device for converting the light that is received by each of the semi sub light receiving surfaces and reflected at the semi sub spots to electrical signals; and
   a sub differential calculation device for calculating the difference in electric signals that are converted from reflected light corresponding to two of the pair of semi sub spots that are adjacent in the direction that is orthogonal to the direction of the track by the semi sub light receiving surface conversion device via two of the semi sub light receiving surfaces.

6. The optical pickup device of claim 5, wherein
   the sub light beam receiving device further comprises
   a sub addition device for adding the sub differential signals that were generated by the sub differential calculation device; and
   the main beam light receiving device comprises:
   two main light receiving surfaces divided in the track direction of the optical recording medium;
   a main light receiving surface conversion device for converting the light that is received by each of the main light receiving surfaces and reflected at the main spot to electrical signals;
   a main differential calculation device for calculating the difference in the electrical signals that are converted by the main light receiving surface conversion device for each of the two main light receiving surfaces; and
   a control signal calculation device for calculating the difference between the sub added signal that was generated by the sub addition device and the main differential signals that was generated by the main differential calculation device by a predetermined ratio.

7. An optical recording medium information reproduction device comprising:
   an optical pickup device of claim 1;
   a servo control unit that performs servo control of the optical pickup device based on the control signal that is generated by the control signal calculation device and electrical signal that is generated by the main beam light receiving device; and
   an information analysis unit that analyzes information that is recorded on the optical recording medium based on the electrical signal that is output from an electrical signal conversion device of the main light beam receiving device.

* * * * *